(12) United States Patent
Randall

(10) Patent No.: US 8,799,883 B2
(45) Date of Patent: Aug. 5, 2014

(54) SYSTEM AND METHOD OF MEASURING APPLICATION RESOURCE USAGE

(75) Inventor: Keith H Randall, Mountain View, CA (US)

(73) Assignee: Hewlett-Packard Development Company, L. P., Houston, TX (US)

( * ) Notice: Subject to any disclaimer, the term of this patent is extended or adjusted under 35 U.S.C. 154(b) by 1421 days.

(21) Appl. No.: 10/356,304

(22) Filed: Jan. 31, 2003

(65) Prior Publication Data

US 2004/0154016 A1  Aug. 5, 2004

(51) Int. Cl.
*G06F 9/45* (2006.01)

(52) U.S. Cl.
USPC .......................................................... 717/156

(58) Field of Classification Search
USPC ............ 718/104–105; 711/105; 717/154–156
See application file for complete search history.

(56) References Cited

U.S. PATENT DOCUMENTS

| | | | |
|---|---|---|---|
| 6,012,052 A * | 1/2000 | Altschuler et al. ................. 707/2 |
| 6,438,573 B1 * | 8/2002 | Nilsen ........................... 718/100 |
| 6,442,663 B1 * | 8/2002 | Sun et al. ....................... 711/202 |
| 6,519,594 B1 * | 2/2003 | Li ................................. 707/10 |
| 6,560,773 B1 * | 5/2003 | Alexander et al. ............. 717/128 |
| 6,658,652 B1 * | 12/2003 | Alexander et al. ............. 717/128 |
| 6,721,759 B1 * | 4/2004 | Rising, III ................... 707/104.1 |
| 6,877,150 B1 * | 4/2005 | Miller et al. .................... 716/18 |
| 7,086,048 B1 * | 8/2006 | Rau et al. ....................... 717/164 |
| 2001/0052110 A1 * | 12/2001 | Orbanes et al. ................... 717/1 |
| 2002/0100034 A1 * | 7/2002 | Croix ............................. 717/163 |
| 2003/0065986 A1 * | 4/2003 | Fraenkel et al. ................. 714/47 |
| 2003/0200293 A1 * | 10/2003 | Fearn et al. .................... 709/223 |
| 2004/0025162 A1 * | 2/2004 | Fisk .............................. 718/105 |
| 2004/0039728 A1 * | 2/2004 | Fenlon et al. ..................... 707/1 |
| 2005/0027871 A1 * | 2/2005 | Bradley et al. ................. 709/227 |
| 2005/0102670 A1 * | 5/2005 | Bretl et al. ....................... 718/1 |
| 2006/0235876 A1 * | 10/2006 | Plouffe, Jr. ................ 707/103 Y |

* cited by examiner

*Primary Examiner* — Anna Deng

(57) ABSTRACT

The present invention relates generally to a system and method for measuring application memory use, and more particularly to measuring heap usage of each of a plurality of applications running inside a single heap. Preferred embodiments of the present invention work by traversing a set of objects in a heap. During this traversal, sets of strongly connected components are identified. Additionally, representative objects of the sets of strongly connected components are identified and a topological sort order of the objects is established. Further, during a second traversal of the objects, the topological sort order is used to identify one or more applications responsible for each of the strongly connected component sets. And, in the process, the resource usage of each application is computed.

23 Claims, 24 Drawing Sheets

SYSTEM AND METHOD OF MEASURING APPLICATION RESOURCE USAGE

The present invention relates generally to a system and method for measuring application resource usage, and more particularly to measuring heap usage of each of a plurality of applications running inside a single heap.

BACKGROUND OF THE INVENTION

A virtual machine (e.g., Java® Virtual Machine) is typically software that acts as an interface between an application (e.g., Java® applications) and a microprocessor or hardware platform that actually performs the instructions of the application. In other words, the virtual machine runs the applications. To do so, virtual machines typically specify an instruction set, a set of registers, a stack, a heap, and a method area. Note that a heap is an area of memory that an application uses to store an amount of data (e.g., objects) that is unknown until application run-time.

A detailed description of virtual machines and applications is provided by Tim Lindholm and Frank Yellin in "The Java™ Virtual Machine Specification" (2nd Edition, Addison-Wesley Publishing Company) (Apr. 14, 1999), which is incorporated herein by reference. Additional information regarding virtual machines and applications can be found on the Internet at http://developer.java.sun.com. The information found at this web site is also incorporated herein by reference.

There are two main approaches to simultaneously running multiple applications by a virtual machine. In a first approach, each application is run by a separate virtual machine. In a second approach, one virtual machine runs a plurality of applications. The first approach is current practice, but virtual machines typically require a significant amount time to initialize and consume a significant amount of memory to operate. Accordingly, running multiple applications under a single virtual machine is advantageous. This approach is particularly efficient for multiple, small applications (e.g., Java@servlet) because virtual machines have fixed costs (e.g., memory and initialization time) that are not proportional to the size of applications running therein.

But using current techniques for running multiple applications under a single virtual machine leads to insufficient resource (e.g., memory) isolation between applications. This lack of isolation enables a single application to consume a disproportionate share of resources to the detriment of the other applications. To improve resource isolation among applications, a virtual machine must measure resource usage and associate the measured resource usage with a specific application.

One method for determining the resource usage of an application is to do a garbage-collection style traversal from the root set of each application. This method does, however, require processing time proportional to the number of applications traversed.

Another method is to keep track of resources (e.g., objects) allocated and deallocated by an application. The method works so long as applications are completely isolated from each other. If, however, applications can share objects, this method is inaccurate because objects that were allocated by one application may be kept alive by another application. Additionally, this method is undesirable because it requires explicit work when freeing garbage (e.g., unused allocated resources or objects) and imposes memory overhead to track the resources.

There is needed in the art therefore a system and method for measuring resource usage of each of a plurality of applications running under a single virtual machine that requires at most two passes across application objects and accounts for object sharing amongst applications.

SUMMARY OF THE INVENTION

The present invention concerns a method for measuring usage of a resource by a set of applications. In particular, a set of applications running under a single virtual machine and a set of resources maintained in a heap allocated to the virtual machine. Each of the applications is said to be responsible for one or more of the resources that comprise a set of one or more application components. More specifically, the resource requirements of each component for which only one application is responsible are assigned to that particular application. Consistently, a portion of the resource requirements of each component for which a plurality of applications are responsible are assigned to each of the plurality of applications.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENTS

Figure 1:
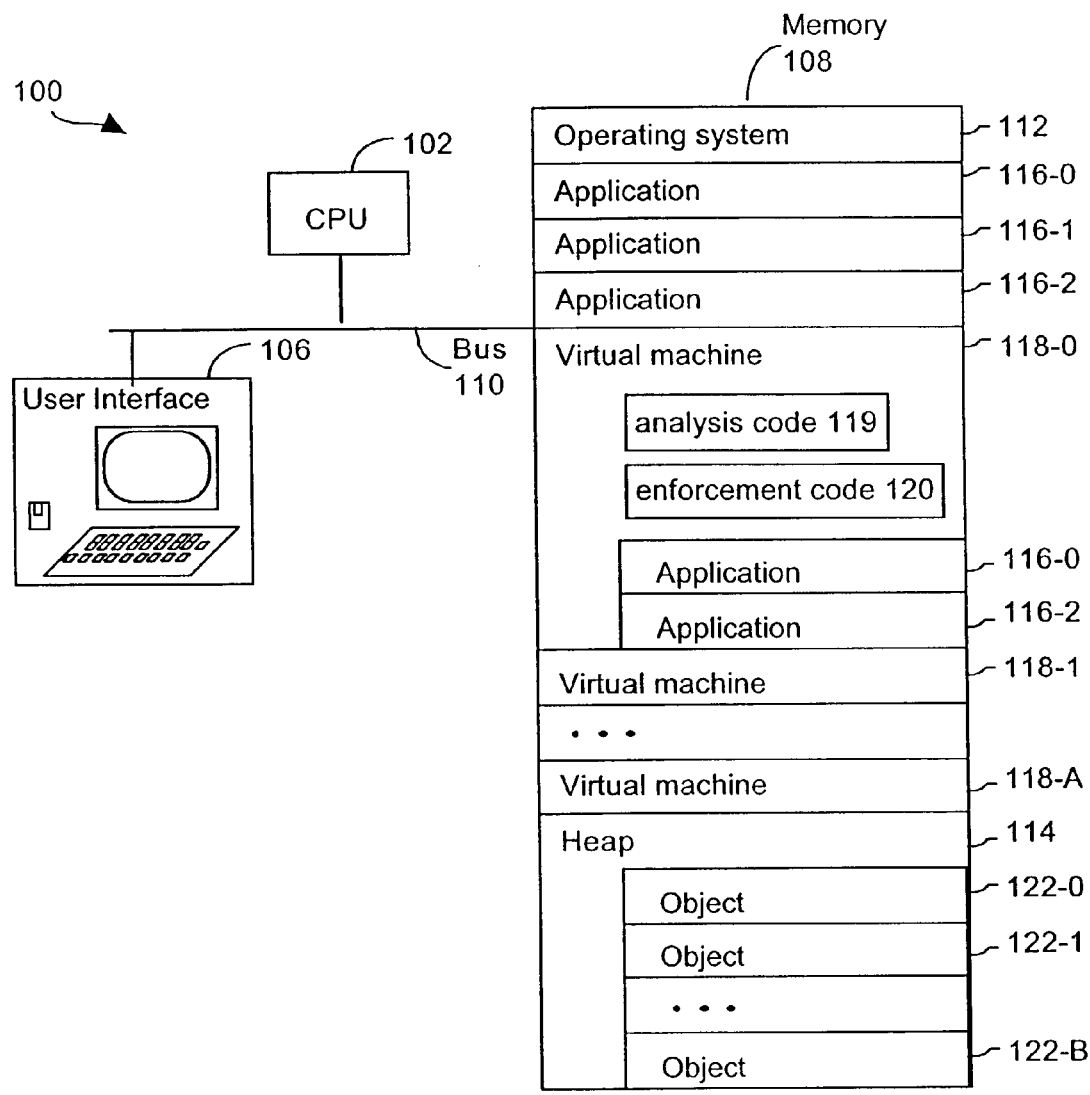
FIG. 1 is a block diagram of a computer system capable of enabling an embodiment of the invention.

Referring to FIG. 1, there is shown a computer system 100, which preferably includes standard computer components such as one or more central processing units (CPU) 102, a memory 108 (including high speed random access memory as well as non-volatile secondary memory), user input/output devices 106 (e.g., keyboard, mouse, and a display), and a bus 110, which inter-connects the aforementioned components.

The memory 108, which typically includes high speed random access memory as well as non-volatile storage such as disk storage, may store an operating system 112, applications 116 (e.g., applications 116-0 through 116-2), virtual machines 118 (e.g., virtual machines 118-0 through 118-D, where A is an arbitrary number), and set aside space for one or more heaps 114. The operating system 112 may include procedures for handling various basic system services and for performing hardware dependent tasks. In particular, the operating system 112 may provide the virtual machines 118 with access to other system resources such as the memory 208. The one or more CPUs 102 may execute, for example, tasks for the virtual machines 118 under the direction of the operating system 112.

The virtual machines 118 may load applications 116 and objects 122 (e.g., objects 122-0 through 122-B, where B is a number defined by the loaded applications 116) into a corresponding heap 114 and incorporate an analysis module (also herein called analysis code) 119 and an enforcement module (also herein called enforcement code) 120. An embodiment of the analysis code 119 is listed in Appendix A, and an embodiment of the analysis code 120 is listed in Appendix B. Both are described in detail below. Not all applications 116 stored in memory 108 are necessarily loaded by a virtual machine 118 at all times. For example, FIG. 1 illustrates a virtual machine 118-0 with only two applications 116-0, 116-2 loaded (e.g., being run within this virtual machine 118-0). The other applications 116 illustrated in FIG. 1 are not loaded (e.g., running). Additionally, the other virtual machines illustrated in FIG. 1 do not have any applications 116 loaded. Note that the applications 116 are often stored in memory 108 only temporarily, which is the case with some applications 116 (e.g., Java® servlets) downloaded from a web site or other location.

The objects 122 loaded by the virtual machine 118 include, but are not limited to, discrete items such as on screen graphics and data and the procedures necessary to operate on this data. These objects 122 are typically maintained in the area of memory 108 reserved for the heap 114 of a particular virtual machine 118. The objects 122 loaded by virtual machines 118 are typically required by loaded applications 116.

The set of objects 122 in a heap 114 for which an application 116 is responsible is the set of objects 122 reachable by one or more object references from the root set of the threads and global variables of an application 116. The amount of memory 108 that an application 116 is responsible for is therefore the sum of the memory requirements of each object 122 for which the application 116 is responsible. Importantly, this amount is adjusted downward to reflect object 122 sharing by applications 116. For example, if three applications 116 are responsible for a given object 122, then a third of the memory requirements of that object 122 are assigned to each of those three applications 116. Object references to a given object 122 by one or more applications may be created and destroyed over time, such that responsibility for a given object 122 may change over time as well. Additional information regarding objects 122 and applications 116, and whether objects 122 are reachable from an application 116, is provided by Gaurav Banga, Peter Druschel, and Jeffrey C. Mogul, "Resource containers: A new facility for resource management in server systems," Proceedings of the $3^{rd}$ USENIX Symposium on Operating Systems Design and Implementation (ODSI), pages 45-58, New Orleans, La., February 1999, which is incorporated herein by reference.

In preferred embodiments, calculating the amount of memory 108 (e.g., heap 114) that each application 116 is responsible for is a two-step process. In a first step, one or more sets of strongly-connected components (SCC) and their representative nodes in a heap 114 are identified. In this context, a component is an object 122 (i.e., node). And two objects 122 are strongly connected if each object 122 is accessible from the other. If a particular object 122 is unable to access any objects 122 that are able to access the particular object 122, the particular object 122 is treated as a representative of a single-object set of SCC. Additionally, the first step includes calculating the topological sort order of the objects 122, which is used in the second step to provide an object-processing order.

Second, each set of SCC is labeled to identify one or more applications 116 that are responsible for the set of SCC and, in the process, accumulate the memory for which each application 116 is responsible.

As noted above, the present invention requires only two passes. But in alternative embodiments, one of these passes is merged with one of the passes of the garbage collector, which is typically a standard process executed by a virtual machine so only one additional pass is required in these embodiments to implement the present invention.

One potential problem is that with the right set of references, it may be the case that all applications 116 can reach all objects 122. In this case, the process of assigning responsibility for object 122 resources to individual applications 116 breaks down. Typically, the everyone-can-reach-everything scenario is caused by a central object (e.g., a registry of applications 116) containing a pointer to each application 116, and each application 116 containing a pointer back to the central object. In this case, the problem is solved by introducing a special type of pointer (e.g., a subclass of java.lang.ref.reference) that the central object has to each of the applications 116. This special type of pointer does not imply responsibility for the object 122 that it points to. Accordingly, the present invention does not traverse such pointers in order to break the cycle that leads to the everyone-can-reach-everything scenario.

Measurement of Resource Usage

Figure 2:
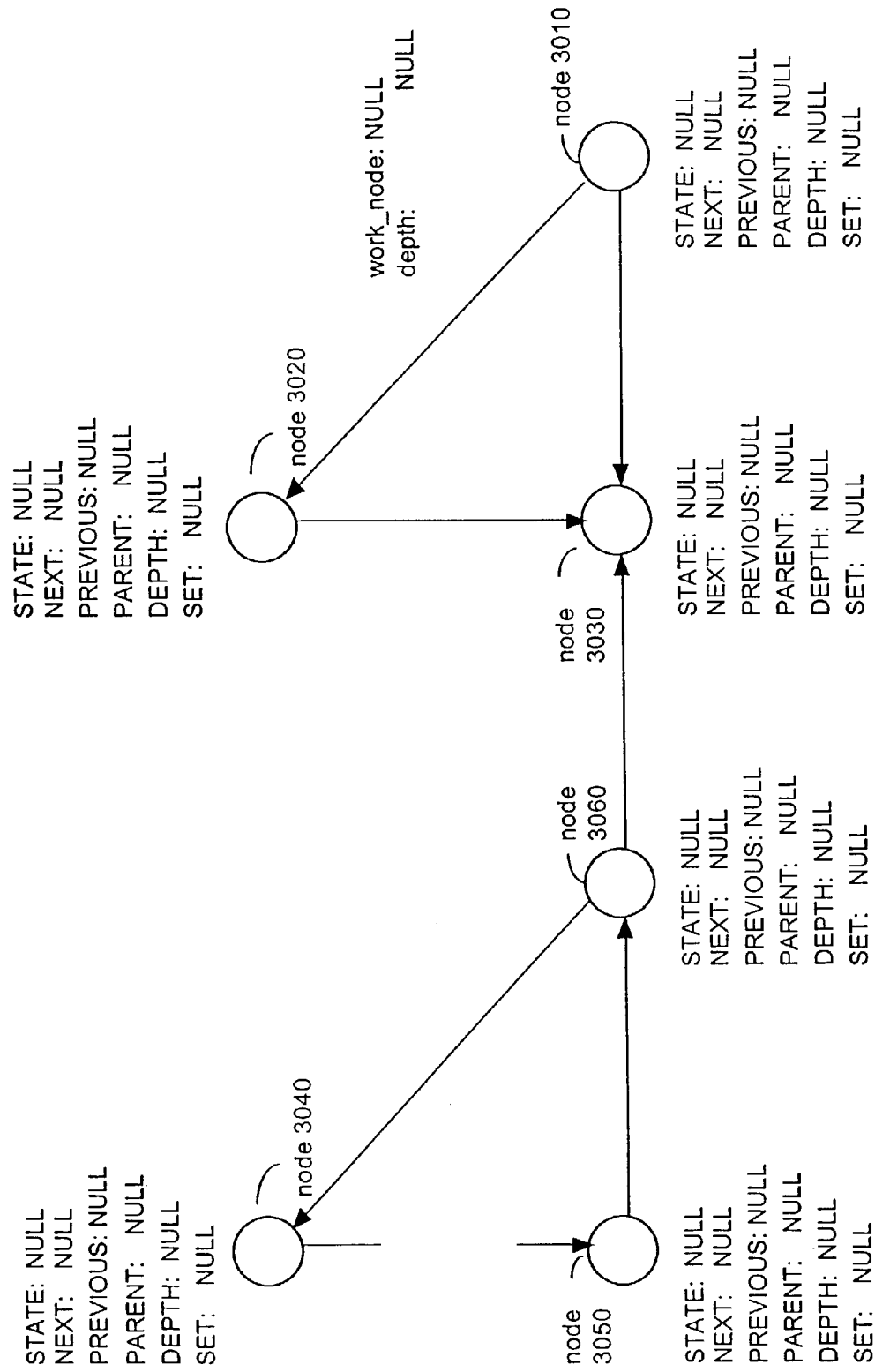
FIGS. 2-24 illustrate a heap owned by a virtual machine at different instants in time, where the heap includes objects allocated by applications being run by the virtual machine and variables used in analysis code in an embodiment of the present invention.

FIGS. 2-24 illustrate snap shots of the heap 114 allocated to a particular virtual machine 118 at various points in time. More specifically, these figures include various nodes that represent objects 122 allocated by applications 116-0 and 116-2 running under the particular virtual machine 118. Note that the frequency at which snap shots of the heap 114 are taken and processed, as described in detail below, may vary from one embodiment to the next. As illustrated in FIG. 2, the arrows connecting the various nodes represent unidirectional links (e.g., references) between the nodes. For example, node 3040 can reach node 3050 directly, but node 3050 can not reach node 3040 directly. Accordingly, some but not all nodes are reachable from the root nodes of applications 116-0 and 116-2 (nodes 3010 and 3040, respectively, in this illustration). Also included in these figures are sets of variables associated with each of the nodes. These variables are used in the analysis code 119 described in detail below while the virtual machine 118 processes a snap shot of the heap 114. In operation, these variables are maintained in memory 108 in connection with the virtual machine 118. Note that some of the variables associated with the various nodes included in these figures change from one figure to the next. These changes illustrate the progress of the virtual machine 118 while processing the snap shot of the heap 114.

As stated above, the present invention is preferably implemented by a virtual machine 118. To do so, the virtual machine 118 includes code consistent with an embodiment of the present invention as exemplified by the code in Appendix A. The analysis code 119 illustrated in Appendix A is designed to measure resource usage by applications 116 being run by the virtual machine 118. The analysis code 119 illustrated in Appendix A illustrates processing steps in one embodiment of the present invention. A variety of programming languages and techniques may be used without departing from the scope of the present invention.

The operation of the present invention generally, and the analysis code 119 of Appendix A specifically, is explained by way of example. Specifically, the analysis code 119 is executed by the virtual machine 118 against the heap 114 illustrated in FIGS. 2-24. For the sake of simplicity, all variables used in the analysis code 119, some of which are illustrated in FIGS. 2-24, are initialized to NULL, though this step is not reflected in the analysis code 119. Execution of the analysis code 119 begins with the doit routine (Appendix A, lns. 98-112). The doit routine calls the pass1 sub-routine once for each application root node (lns. 99-103). As noted above, the heap snap shot illustrated in FIGS. 2-24 includes two application root nodes, nodes 3010 and 3040 respectively. Accordingly, the pass1 sub-routine is executed twice. When the pass1 subroutine is called for the first time, the doit sub-routine passes a pointer to one of the two application root nodes. For the purpose of illustration, we assume that the doit subroutine passes a pointer to node 3010 first.

The subroutine pass1 identifies the sets of SCC, and their representatives, and returns the topological sort of the nodes. Upon completion, the state of every node is either REP or DONE. A node is a REP node of a set of SCC if and only if there is no path from that node to any node which is its ancestor. Each REP node is a representative of a set of SCC. Each DONE node is an element of the set of SCC. The representative or REP node of a DONE node's set of SCC is located by reference to the DONE node's parent pointer. Additionally, the REP nodes are linked together in a singly-linked list which is the topological sort order of the set of SCC. Finally, the set fields of all REP nodes are initialized to the empty set.

The pass1 subroutine works by performing a depth-first traversal of the nodes. As described in more detail below, each node is assigned a number relating to its depth within processed nodes. Thus, a first node is a second node's ancestor if the second node is accessible from the first node and the first node has a depth that is lower than the second node's depth.

Referring to the analysis code 119 listed in Appendix A, the pass1 subroutine begins by setting the state of the variable root (e.g., node 3010) to FOUND, the variable work_node to reference node 3010, and the variable depth to zero (lns. 2-4). After setting work_node to reference node 3010, changes and references directed to the variable work_node are actually directed to node 3010.

Program flow then enters a while loop that executes so long as the variable work_node does not equal NULL (lns. 5-54). The while loop begins by setting variable v to the variable work_node (e.g., node 3010) (ln. 6). Thus, changes and references directed to the variable v are actually directed to the node 3010 such that the variable v functions as a pointer to the variables associated with the node 3010.

Program flow then enters a switch-case statement keyed to the state of variable v (e.g., node 3010). In this instance, the state assigned to the variable v (e.g., node 3010) is FOUND. Thus, the state of variable v (e.g., node 3010) is set to SCANNED, the depth of variable v (e.g., node 3010) is set to zero (e.g., current value of the variable depth), and the variable depth is incremented to 1 (lns. 9-11).

Program flow then enters a for-all loop that is executed for each node accessible from variable v (e.g., node 3010) (lns. 12-29). As illustrated in FIG. 2, nodes 3020 and 3030 are accessible from node 3010. Though no particular order is required, the nodes accessible from node 3010 are processed in accordance with the identifier assigned to each node. Accordingly, node 3020 is processed first.

If the state of variable w (e.g., node 3020) is NULL, the analysis code 119 included in the first if statement of the current for-all loop is executed. FIG. 2 indicates that the state of node 3020 is NULL so the state of variable w (e.g., node 3020) is set to FOUND (ln. 14). Additionally, if the state of the variable work_node (e.g., node 3010) is FOUND, the previous-node pointer of the variable work_node (e.g., node 3010) is set to the variable w (e.g., node 3020) (ln. 15). Since the state of the variable work_node (e.g., node 3010) was set to SCANNED in line 9 as described above, the previous-node pointer of the variable work_node (e.g., node 3010) is not set to the variable w (e.g., node 3020). Then, the next-node pointer of the variable w (e.g., node 3020) is set to the variable work_node (e.g., node 3010) (ln. 16). Finally, the variable work_node is set to the variable w (e.g., node 3020) (ln. 17).

Next, node 3030 (the other node associated with node 3010) is processed in the current for-all loop (lns. 12-29). If the state of variable w (e.g., node 3030) is NULL, the analysis code 119 included in the first if statement of the current for-all loop is executed. FIG. 2 indicates that the state of node 3030 is NULL so the state of variable w (e.g., node 3030) is set to FOUND (ln. 14). Additionally, if the state of the variable work_node (e.g., node 3020) is FOUND, the previous-node pointer of the variable work_node (e.g., node 3020) is set to the variable w (e.g., node 3030) (ln. 15). Since the state of the variable work_node (e.g., node 3010) was set to SCANNED in line 9 as described above, the previous-node pointer of the variable work_node (e.g., node 3020) is not set to the variable w (e.g., node 3030). Then, the next-node pointer of the variable w (e.g., node 3030) is set to the variable work_node (e.g., node 3020) (ln. 16). Finally, the variable work_node is set to the variable w (e.g., node 3030) (ln. 17). After executing the steps described in the current and five previous paragraphs, the values associated with the variables included in FIG. 2 reflect the values illustrated in FIG. 3. As illustrated above, decision making within the analysis code 119 is governed by the values of the various variable illustrated in FIGS. 2-24.

Figure 3:
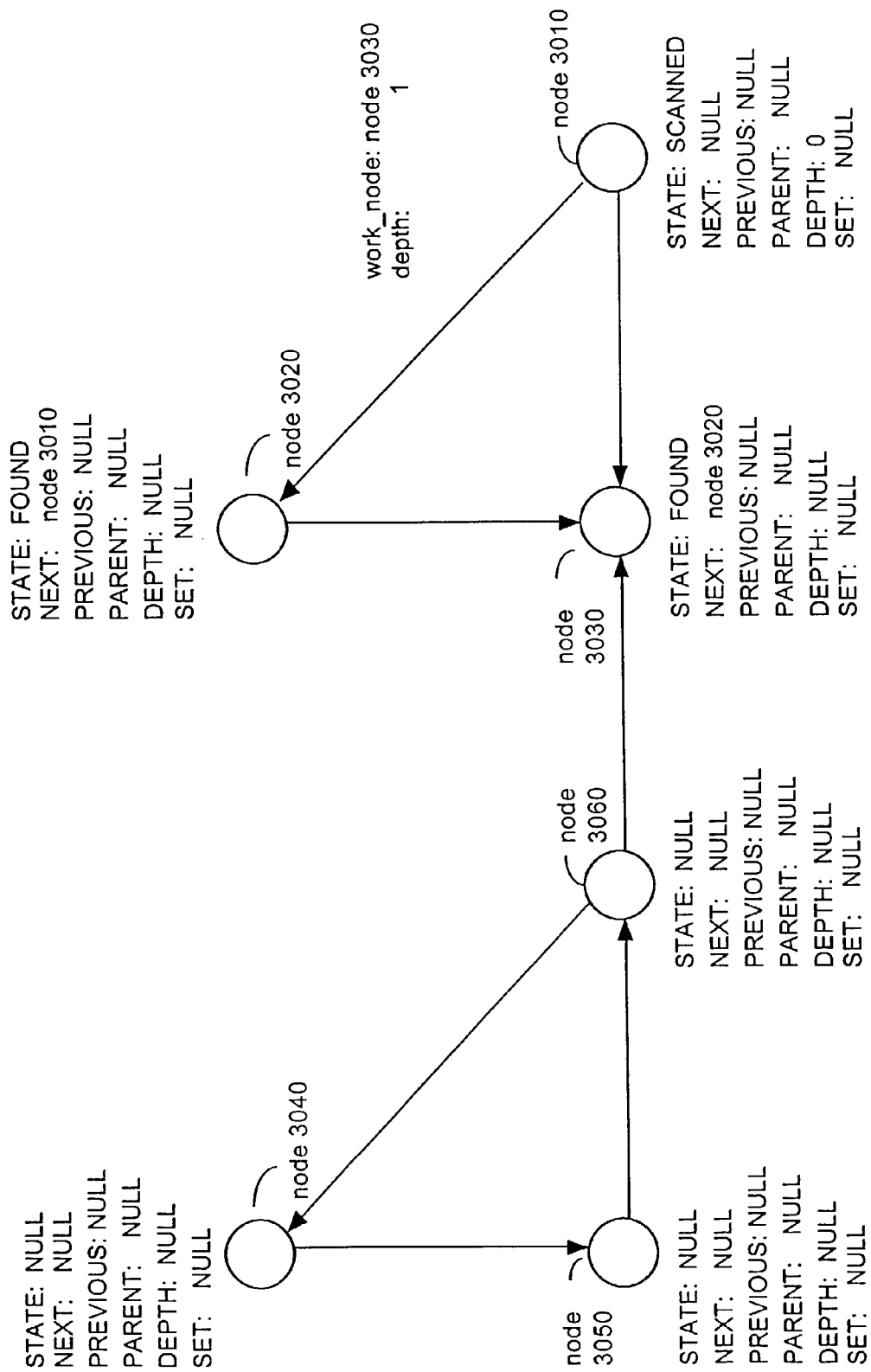

Program flow then returns to the top of the while loop, where the value of the variable work_node is tested. FIG. 3 indicates that the value of the variable work_node is node 3030 so the while loop is executed at least one more time. The while loop begins by setting variable v to the variable work_node (e.g., node 3030) (ln. 6).

Program flow then enters the switch-case statement keyed to the state of variable v (e.g., node 3030). In this instance, the state assigned to the variable v (e.g., node 3030) is FOUND. Thus, the state of variable v (e.g., node 3030) is set to SCANNED, the depth of variable v (e.g., node 3030) is set to one (e.g., current value of the variable depth), and the variable depth is incremented to two (ins. 9-11).

Program flow then enters a for-all loop that is executed for each node accessible from v (e.g., node 3030) (lns. 12-29). As illustrated in FIG. 3, no nodes are accessible from node 3030 so the analysis code 119 included in the for-all loop beginning at line 12 is not executed. After executing the steps described in the current and two previous paragraphs, the values associated with the variables included in FIG. 3 reflect the values illustrated in FIG. 4.

Program flow then returns to the top of the while loop, where the value of the variable work_node is tested. The value of the variable work_node remains node 3030 so the while loop is executed at least one more time. The while loop begins by resetting variable v to the variable work_node (e.g., node 3030) (ln. 6).

Figure 4:
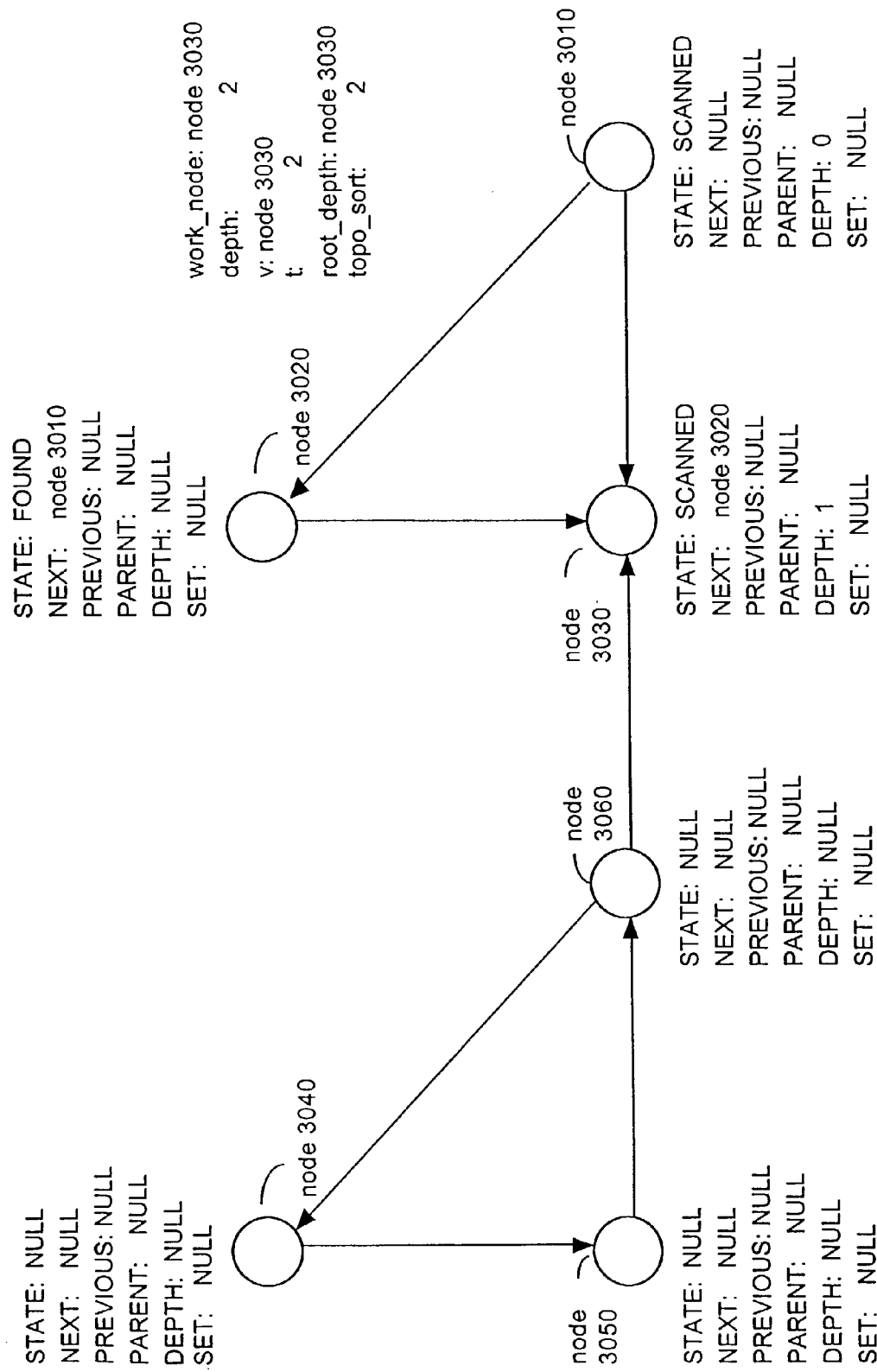

Program flow then enters the switch-case statement keyed to the state of variable v (e.g., node 3030). FIG. 4 indicates that the state assigned to the variable v (e.g., node 3030) is SCANNED. Thus, the variable work_node is set to v.next, which is node 3020, as indicated in FIG. 4 (ln. 32). Additionally, the variable depth is reduced to a value of one (ln. 33); variable root_depth is set to the variable depth (e.g., one) (ln. 34); and variable t is set to the variable v (e.g., node 3030) (ln. 35).

Program flow then enters a for-all loop that is executed for each node accessible from variable v (e.g., node 3030) (lns. 12-29). As illustrated in FIG. 3, no nodes are accessible from node 3030 so the analysis code 119 included in the for-all loop beginning at line 36 is not executed.

Next, the virtual machine 118 compares the value of the variable t to the value of variable v (ln. 43). If they are equal, lines 44-47 are executed. Because the analysis code 119 included in the for-all loop beginning at line 36 was not executed, the two remain equal. Accordingiy, the state of variable v (e.g., node 3030) is set to REP (ln. 44); the set of variable v (e.g., node 3030) is set to EMPTYSET (ln. 45); the next-node pointer of variable v (e.g., node 3030) is set to the variable topo_sort (e.g., NULL) (ln. 46); and the variable topo_sort is set to the variable v (e.g., node 3030) (ln. 47). After executing the steps described in the current and two previous paragraphs, the values associated with the variables included in FIG. 4 reflect the values illustrated in FIG. 5.

Figure 5:
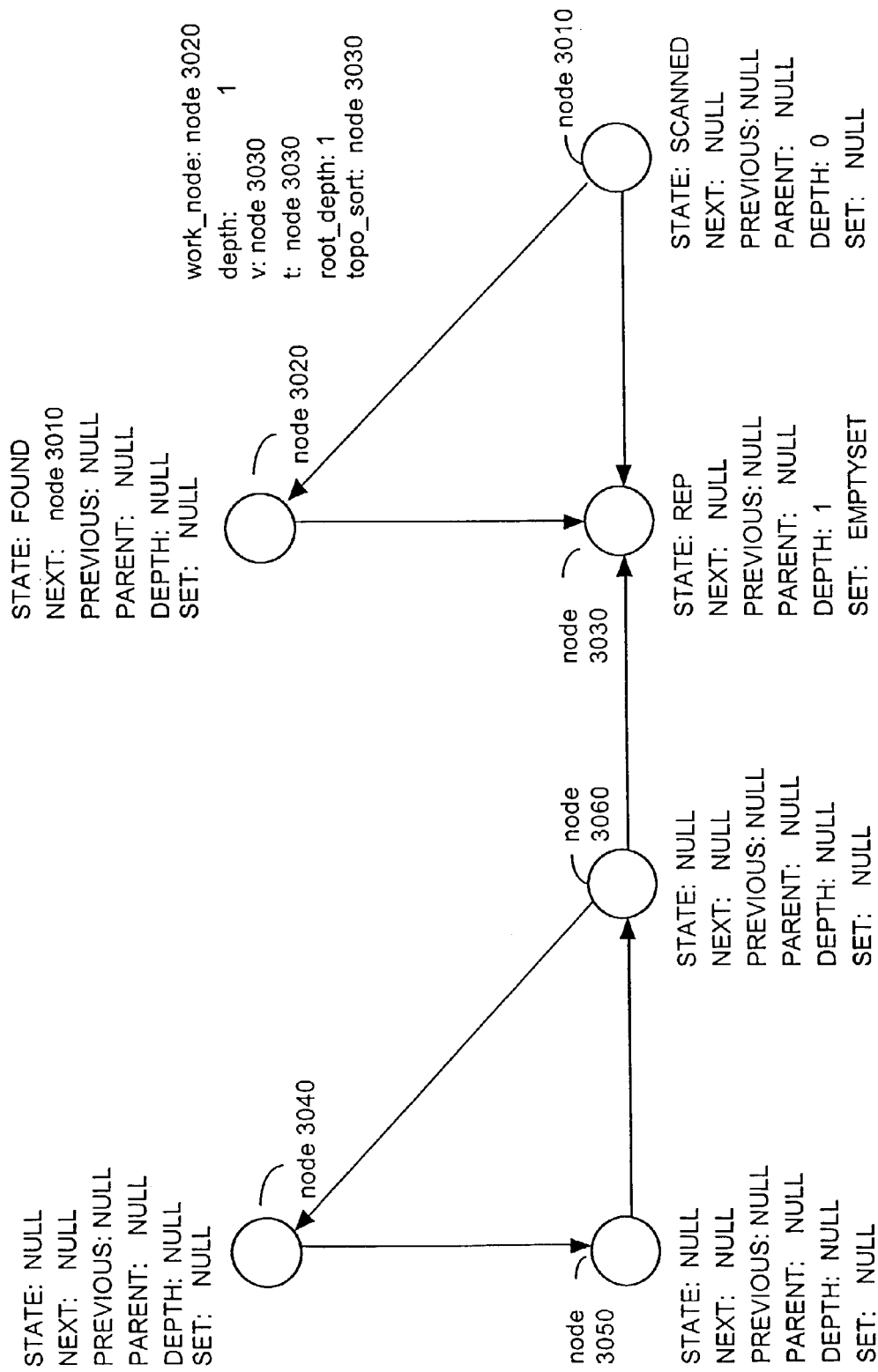

Program flow then returns to the top of the while loop, where the value of the variable work_node is tested. FIG. 5 indicates that the variable work_node points to node 3020 so the while loop is executed at least one more time. The while loop begins by resetting variable v to the variable work_node (e.g., node 3020) (ln. 6).

Program flow then enters the switch-case statement keyed to the state of variable v (e.g., node 3020). FIG. 5 indicates that the state assigned to the variable v (e.g., node 3020) is FOUND. Thus, the state of variable v (e.g., node 3020) is set to SCANNED, the depth of variable v (e.g., node 3020) is set to one (e.g., current value of the variable depth), and the variable depth is incremented to two (lns. 9-11).

Program flow then enters a for-all loop that is executed for each node accessible from variable v (e.g., node 3020) (lns. 12-29). As illustrated in FIG. 5, node 3030 is accessible from node 3020. FIG. 5 indicates that the state of node 3030 is REP so the analysis code 119 associated with the if statement beginning at line 13 is not executed. After executing the steps described in the current and two previous paragraphs, the values associated with the variables included in FIG. 5 reflect the values illustrated in FIG. 6.

Figure 6:
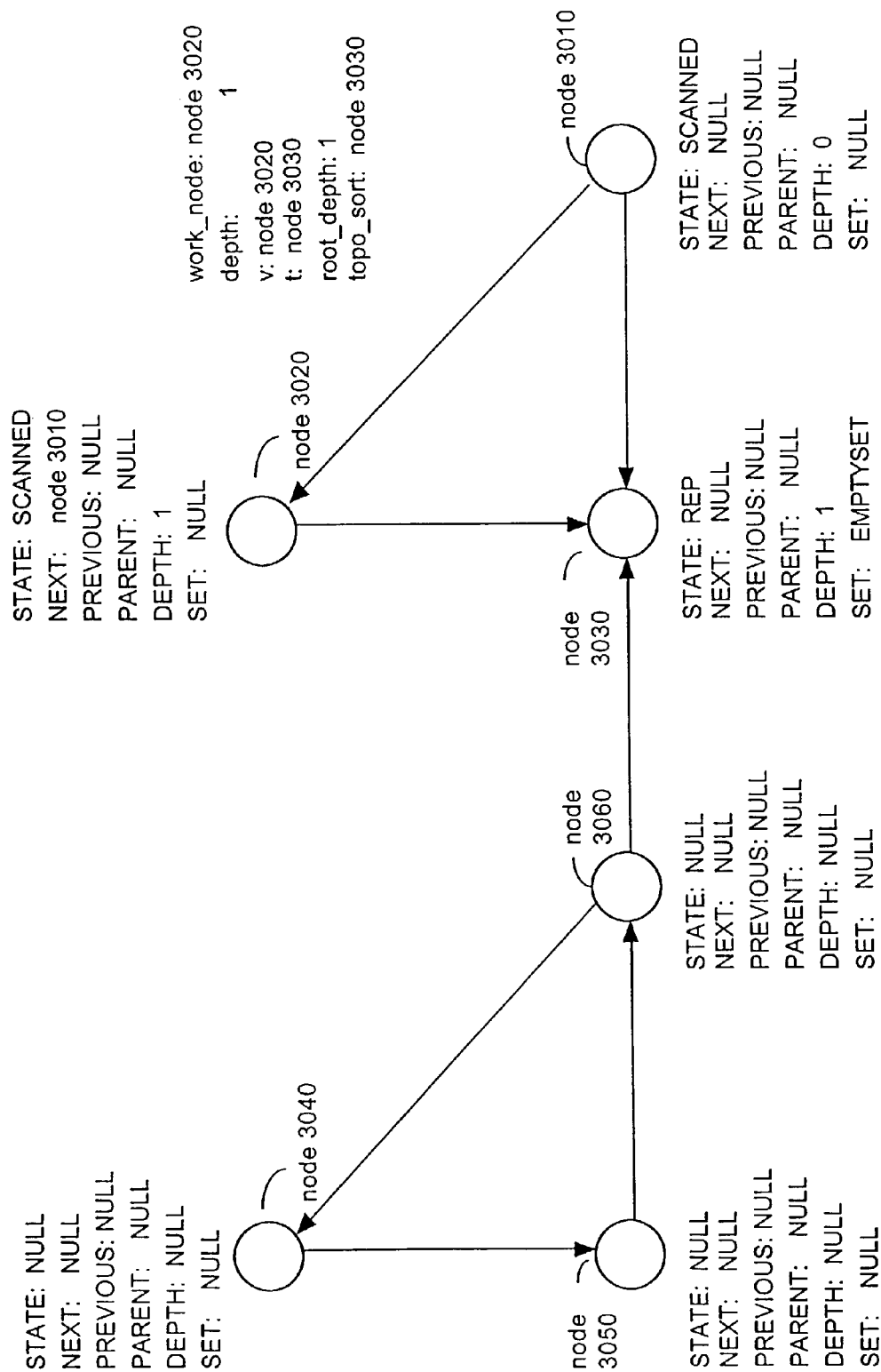

Program flow then returns to the top of the while loop, where the value of the variable work_node is tested. FIG. 6 indicates that the value of the variable work_node remains node 3020 so the while loop is executed at least one more time. The while loop begins by resetting variable v to the variable work_node (e.g., node 3020) (ln. 6).

Program flow then enters the switch-case statement keyed to the state of variable v (e.g., node 3020). FIG. 6 indicates that the state assigned to the variable v (e.g., node 3030) is SCANNED. Thus, the variable work_node is set to v.next, which is node 3010, as indicated in FIG. 6 (ln. 32). Additionally, the variable depth is reduced to a value of zero (in. 33); variable root_depth is set to the variable depth (e.g., zero) (ln. 34); and variable t is set to the variable v (e.g., node 3020) (ln. 35).

The virtual machine 1118 then tests variable v (e.g., node 3020) before entering the for-all loop beginning at line 36. As illustrated in FIG. 2, node 3030 is accessible from node 3020 so the analysis code 1119 included in the for-all loop is executed. The variable w (e.g., node 3030) is then passed to the subroutine root, which returns a parent node of node 3030.

The subroutine root begins on line 88 of Appendix A by setting variable y to x (e.g., node 3030) (ln. 89). A while loop is then executed until the state of x no longer equals DONE (ln. 90). As illustrated in line 90, the while loop consists of setting x to the parent of x. In this instance, however, the state of x (e.g., node 3030) is REP so the analysis code 119 included in the while loop is not executed. A second while loop is also included in subroutine root. This while loop sets variable tmp to y.parent (e.g., NULL or the parent node of x), sets y.parent to x, and sets y to tmp (e.g., NULL or the parent of x). In other words, this section of the analysis code 119 follows parent pointers of nodes having a state equal to DONE, and then "short circuits" the parent pointers of nodes traversed. However, this section of the analysis code 119 is executed only if y (e.g., node 3030) does not equal x (e.g., node 3030), which it does not in this instance. The subroutine rcot then returns the value of variable x (e.g., node 3030).

The value returned by the call to the subroutine rout is then stored in variable r. The state and depth of the variable r (e.g., node 3030) are then compared to the state SCANNED and the variable root_depth respectively (ln. 38). If the depth of the variable r (e.g., node 3030) is not less than the value of the variable root_depth or the state of the variable r (e.g., node 3030) does not equal SCANNED, the analysis code 119 included in the if statement beginning at line 38 is not executed. In this instance, the state of the variable r (e.g., node 3030) is REP so this section of the analysis code 1119 is not executed.

Next, the virtual machine 1118 compares the value of the variable t to the value of variable v (ln. 43). If they are equal, lines 44-47 are executed. Because the analysis code 119 included in the for-all loop beginning at line 36 was not executed, the two remain equal.

Accordingly, the state of variable v (e.g., node 3020) is set to REP (in. 44); the set of variable v (e.g., node 3020) Is set to EMPTYSET (ln. 45); the next-node pointer of variable v (e.g., node 3020) is set to the variable topo_sort (e.g., node 3030) (ln. 46); and the variable topo_sort is set to the variable v (e.g., node 3020) (ln. 47). After executing the steps described in the current and two previous paragraphs, the values associated with the variables included in FIG. 6 reflect the values illustrated in FIG. 7.

Figure 7:
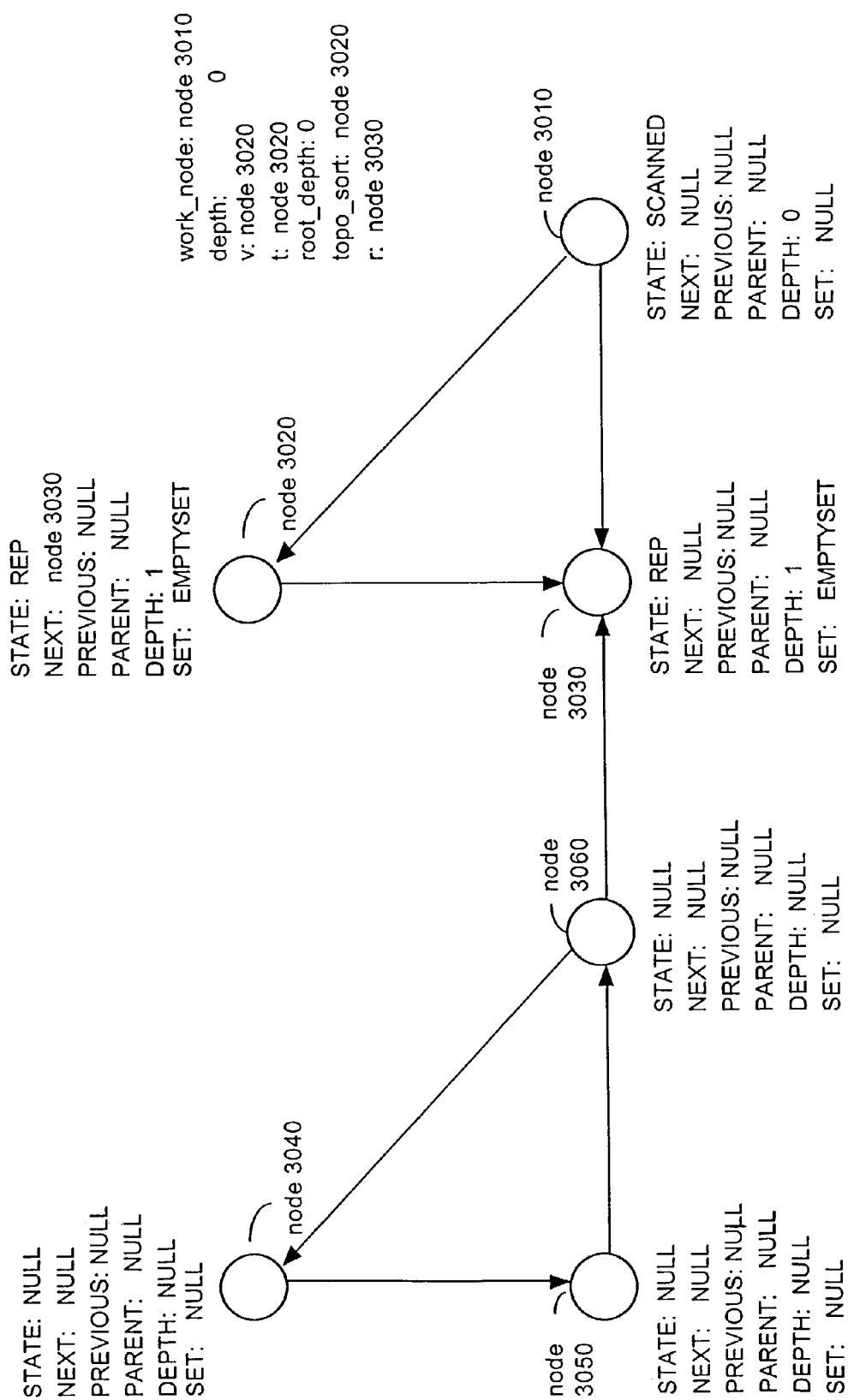

Program flow then returns to the top of the while loop, where the value of the variable work_node is tested. FIG. 7 indicates that the value of the variable work_node is node 3010 so the while loop is executed at least one more time. The while loop begins by resetting variable v to the variable work_node (e.g., node 3010) (ln. 6).

Program flow then enters the switch-case statement keyed to the state of variable v (e.g., node 3010). FIG. 7 indicates that the state assigned to the variable v (e.g., node 3010) is SCANNED. Thus, the variable work_node is set to v.next, which is NULL, as indicated in FIG. 7 (ln. 32). Additionally, the variable depth is reduced to a value of negative one (ln. 33); variable root_depth is set to the variable depth (e.g., negative one) (ln. 34); and variable t is set to the variable v (e.g., node 3010) (ln. 35).

The virtual machine 118 then tests variable v (e.g., node 3010) before entering the for-all loop beginning at line 36. As illustrated in FIG. 7, node 3020 and node 3030 are accessible from node 3010 so the analysis code 119 included in the for-all loop beginning at line 36 is executed. First, the variable w (e.g., node 3020) is passed to the subroutine root, which returns a parent node of node 3020. The subroutine root, which is described in detail above, returns node 3020 to the variable r in this instance.

The state and depth of the variable r (e.g., node 3020) are then compared to the state SCANNED and the variable root_depth respectively (ln. 38). If the depth of the variable r (e.g., node 3020) is not less than the value of the variable root_depth or the state of the variable r (e.g., node 3020) does not equal SCANNED, the analysis code 119 included in the if statement beginning at line 38 is not executed. In this instance, the state of the variable r (e.g., node 3020) is REP so this section of the analysis code 119 is not executed.

Program flow then returns to the top of the for-all loop beginning at line 36. The variable w (e.g., node 3030) is passed to the subroutine root, which returns a parent node of node 3030 (ln. 37). The subroutine root, which is described in detail above, returns node 3030 to the variable r in this instance.

The state and depth of the variable r (e.g., node 3030) are then compared to the state SCANNED and the variable root_depth respectively (ln. 38). If the depth of the variable r (e.g., node 3030) is not less than the value of the variable root_depth or the state of the variable r (e.g., node 3030) does not equal SCANNED, the analysis code 119 included in the if statement beginning at line 38 is not executed. In this instance, the state of the variable r (e.g., node 3030) is REP so this section of the analysis code 119 is not executed.

Next, the virtual machine 118 compares the value of the variable t to the value of variable v (ln. 43). If they are equal, lines 44-47 are executed. Because the analysis code 119 included in the for-all loop beginning at line 36 was not executed, the two remain equal. Accordingly, the state of variable v (e.g., node 3010) is set to REP (ln. 44); the set of variable v (e.g., node 3010) is set to EMPTYSET (ln. 45); the next-node pointer of variable v (e.g., node 3010) is set to the variable topo_sort (e.g., node 3020) (ln. 46); and the variable topo_sort is set to the variable v (e.g., node 3010) (ln. 47). After executing the steps described in the current and six previous paragraphs, the values associated with the variables included in FIG. 7 reflect the values illustrated in FIG. 8.

Figure 8:
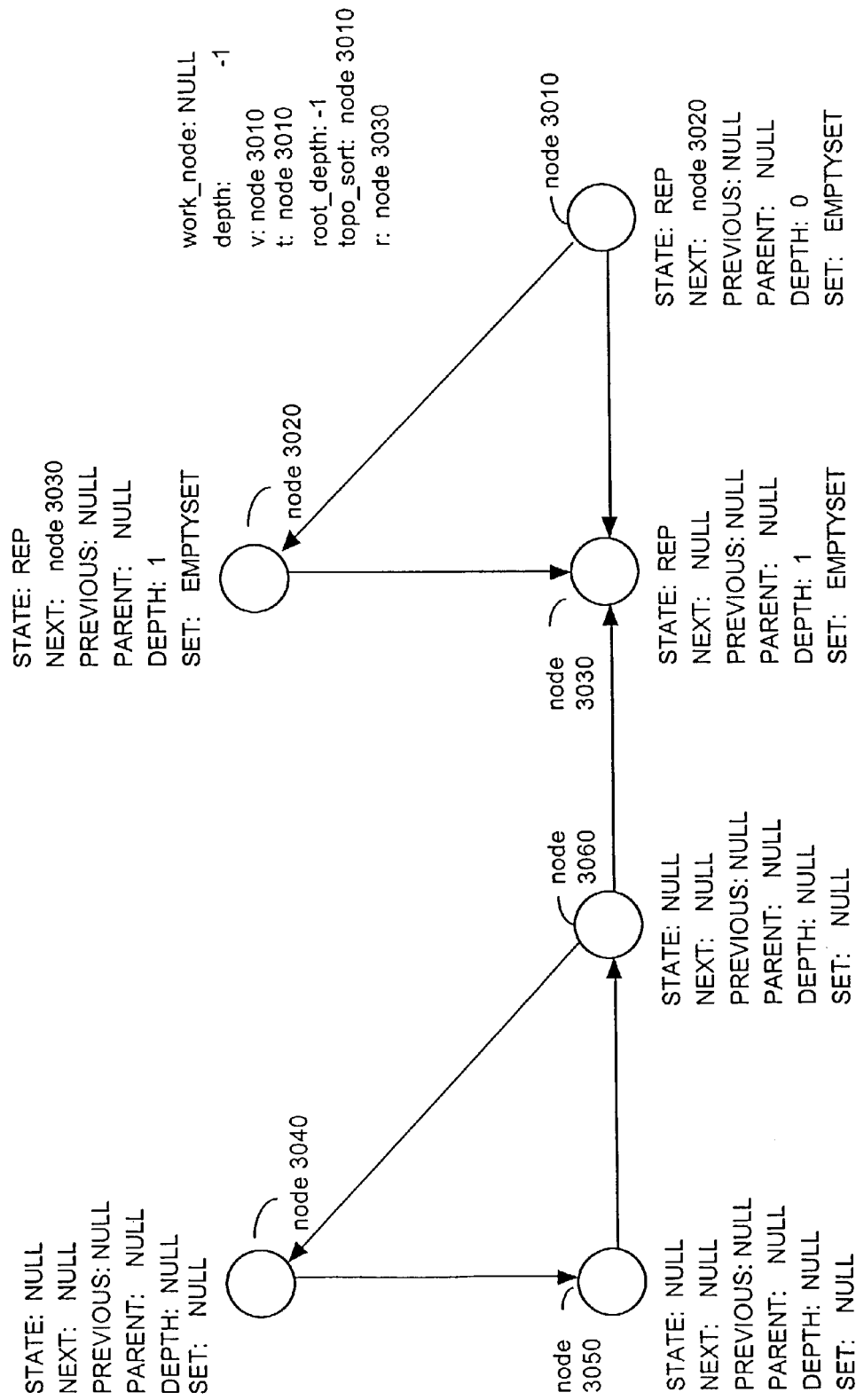

Program flow then returns to the top of the while loop, where the value of the variable work_node is tested. FIG. 8 indicates that the value of the variable work_node is NULL so program flow jumps to line 56, which returns the value of the variable topo_sort to the calling routine doit. The routine doit responds by calling subroutine pass1 again with the variable root set to node 3040 (ln. 101).

The pass1 subroutine begins by setting the state variable of root (e.g., node 3040) to FOUND (ln. 2). Next, the variable work_node is set to the variable root (e.g., node 3040) and the variable depth is set to zero (lns. 34).

The pass1 subroutine then enters a while loop that executes so long as the variable work_node does not equal NULL (lns. 6-56). The while loop begins by setting variable v to the variable work_node (e.g., node 3040) (ln. 6).

Program flow then enters a switch-case statement keyed to the state of variable v (e.g., node 3040). In this instance, the state assigned to the variable v (e.g., node 3040) is FOUND. Thus, the state of variable v (e.g., node 3040) is set to SCANNED, the depth of variable v (e.g., node 3040) is set to zero (e.g., current value of the variable depth), and the variable depth is incremented to 1 (lns. 9-11).

Program flow then enters a for-all loop that is executed for each node accessible from variable v (e.g., node 3040) (lns. 12-29). As illustrated in FIG. 8, node 3050 is accessible from node 3040. If the state of variable w (e.g., node 3050) is NULL, the analysis code 119 included in the first if statement of the current for-all loop is executed. FIG. 8 indicates that the state of node 3050 is NULL so the state of variable w (e.g., node 3050) is set to FOUND (ln. 14). Additionally, if the state of the variable work_node (e.g., node 3040) is FOUND, the previous-node pointer of the variable work_node (e.g., node 3050) is set to the variable w (e.g., node 3040) (ln. 15). Since the state of the variable work_node (e.g., node 3040) was set to SCANNED in line 9 as described above, the previous-node pointer of the variable work_node (e.g., node 3040) is not set to the variable w (e.g., node 3050). Then, the next-node pointer of the variable w (e.g., node 3050) is set to the variable work_node (e.g., node 3040) (ln. 16). Finally, the variable work_node is set to the variable w (e.g., node 3050) (ln. 17). After executing the steps described in the current and three previous paragraphs, the values associated with the variables included in FIG. 8 reflect the values illustrated in FIG. 9.

Figure 9:
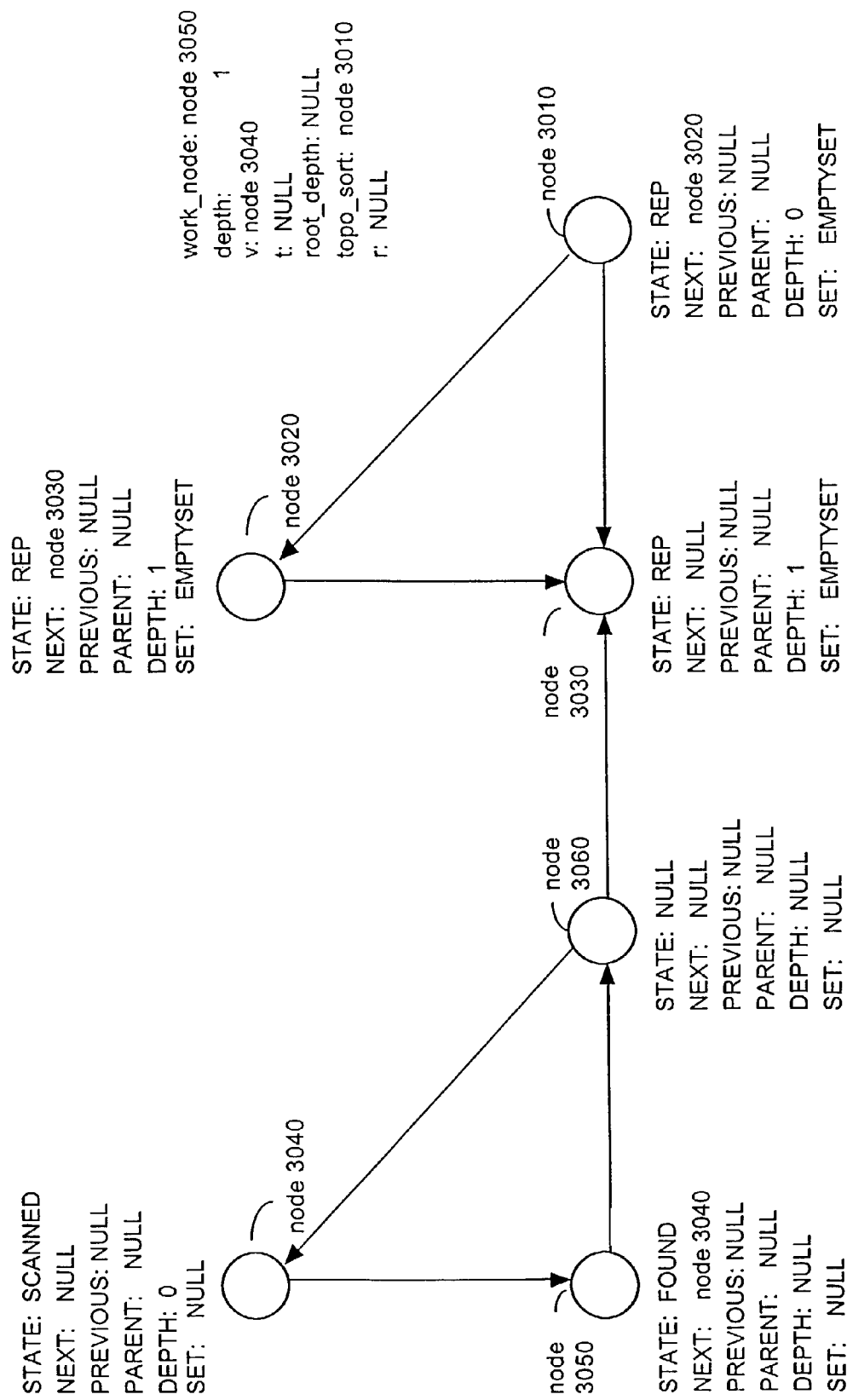

Program flow then returns to the top of the while loop, where the value of the variable work_node is tested. FIG. 9 indicates that the value of the variable work_node is node 3050 so the while loop is executed at least one more time. The while loop begins by resetting variable v to the variable work_node (e.g., node 3050) (ln. 6).

Program flow then enters a switch-case statement keyed to the state of variable v (e.g., node 3050). In this instance, the state assigned to the variable v (e.g., node 3050) is FOUND. Thus, the state of variable v (e.g., node 3050) is set to SCANNED, the depth of variable v (e.g., node 3050) is set to one (e.g., current value of the variable depth), and the variable depth is incremented to 2 (lns. 9-11).

Program flow then enters a for-all loop that is executed for each node accessible from variable v (e.g., node 3050) (lns. 12-29). As illustrated in FIG. 8, node 3060 is accessible from node 3050. If the state of variable w (e.g., node 3060) is NULL, the analysis code 119 included in the first if statement of the current for-all loop is executed. FIG. 9 indicates that the state of node 3060 is NULL so the state of variable w (e.g., node 3060) is set to FOUND (ln. 14). Additionally, if the state of the variable work_node (e.g., node 3050) is FOUND, the previous-node pointer of the variable work_node (e.g., node 3050) is set to the variable w (e.g., node 3060) (ln. 15). Since the state of the variable work_node (e.g., node 3050) was set to SCANNED in line 9 as described above, the previous-node pointer of the variable work_node (e.g., node 3050) is not set to the variable w (e.g., node 3060). Then, the next-node pointer of the variable w (e.g., node 3060) is set to the variable work_node (e.g., node 3050) (ln. 16). Finally, the variable work_node is set to the variable w (e.g., node 3060) (ln. 17). After executing the steps described in the current and two previous paragraphs, the values associated with the variables included in FIG. 9 reflect the values illustrated in FIG. 10.

Figure 10:
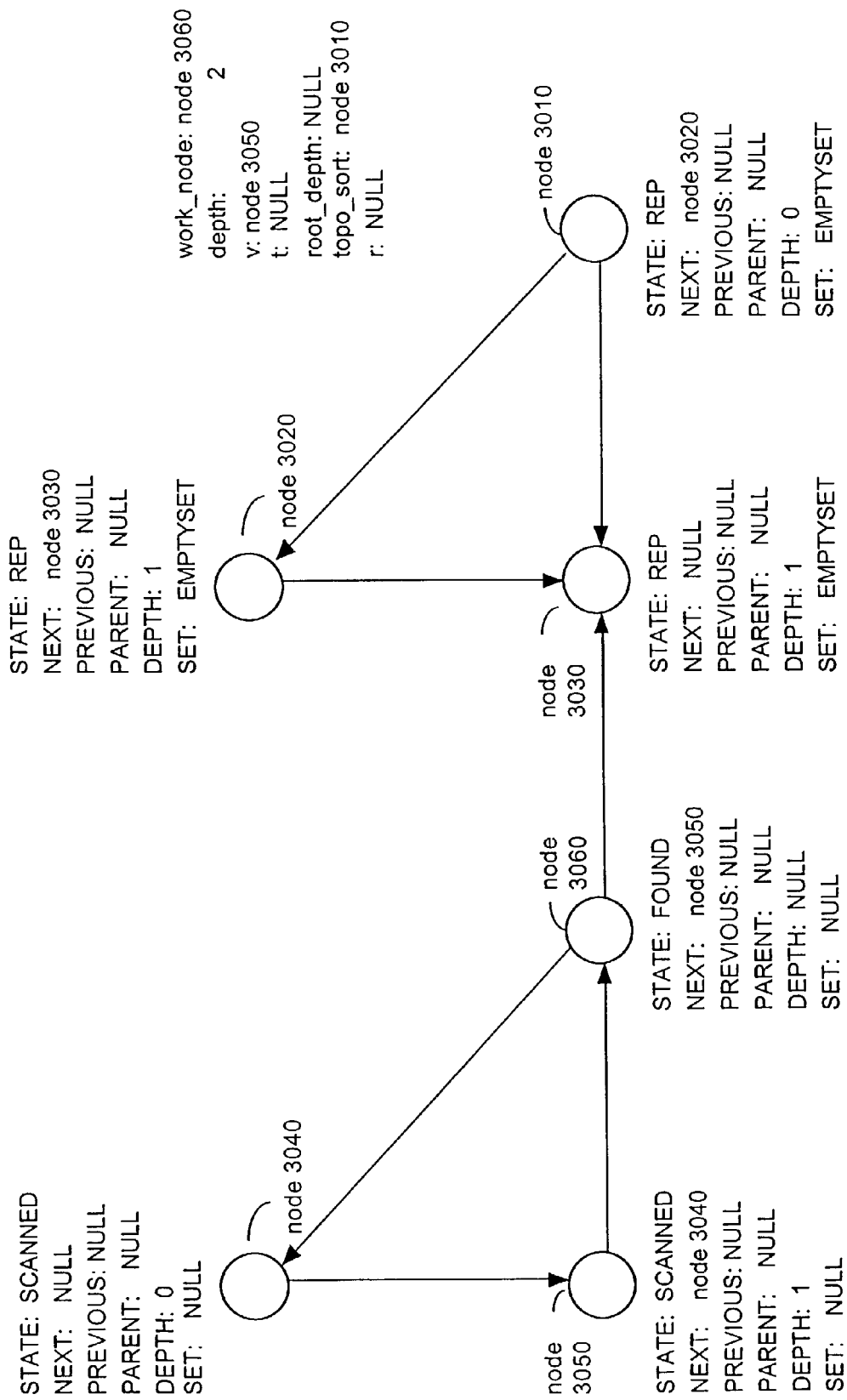

Program flow then returns to the top of the while loop, where the value of the variable work_node is tested. FIG. 10 indicates that the value of the variable work_node is node 3060 so the while loop is executed at least one more time. The while loop begins by resetting variable v to the variable work_node (e.g., node 3060) (ln. 6).

Program flow then enters a switch-case statement keyed to the state of variable v (e.g., node 3060). In this instance, the state assigned to the variable v (e.g., node 3060) is FOUND. Thus, the state of variable v (e.g., node 3060) is set to SCANNED, the depth of variable v (e.g., node 3060) is set to two (e.g., current value of the variable depth), and the variable depth is incremented to 3 (lns. 9-11).

Program flow then enters a for-all loop that is executed for each node accessible from variable v (e.g., node 3060) (lns. 12-29). As illustrated in FIG. 10, nodes 3030 and 3040 are accessible from node 3060. Though no particular order is required, the nodes accessible from node 3060 are processed in accordance with the identifier assigned to each node. Accordingly, node 3030 is processed first.

If the state of variable w (e.g., node 3030) is not set to NULL or FOUND, the analysis code 119 included in the for-all loop beginning at line 12 is not executed. FIG. 10 indicates that the state of node 3030 is REP so the for-all loop is repeated with variable w set to node 3040 (the other node accessible from node 3060) is processed. However, the state of variable w (e.g., node 3040) is SCANNED so the analysis code 119 included in the for-all loop beginning at line 12 is not executed. After executing the steps described in the current and three previous paragraphs, the values associated with the variables included in FIG. 10 reflect the values illustrated in FIG. 11.

Figure 11:
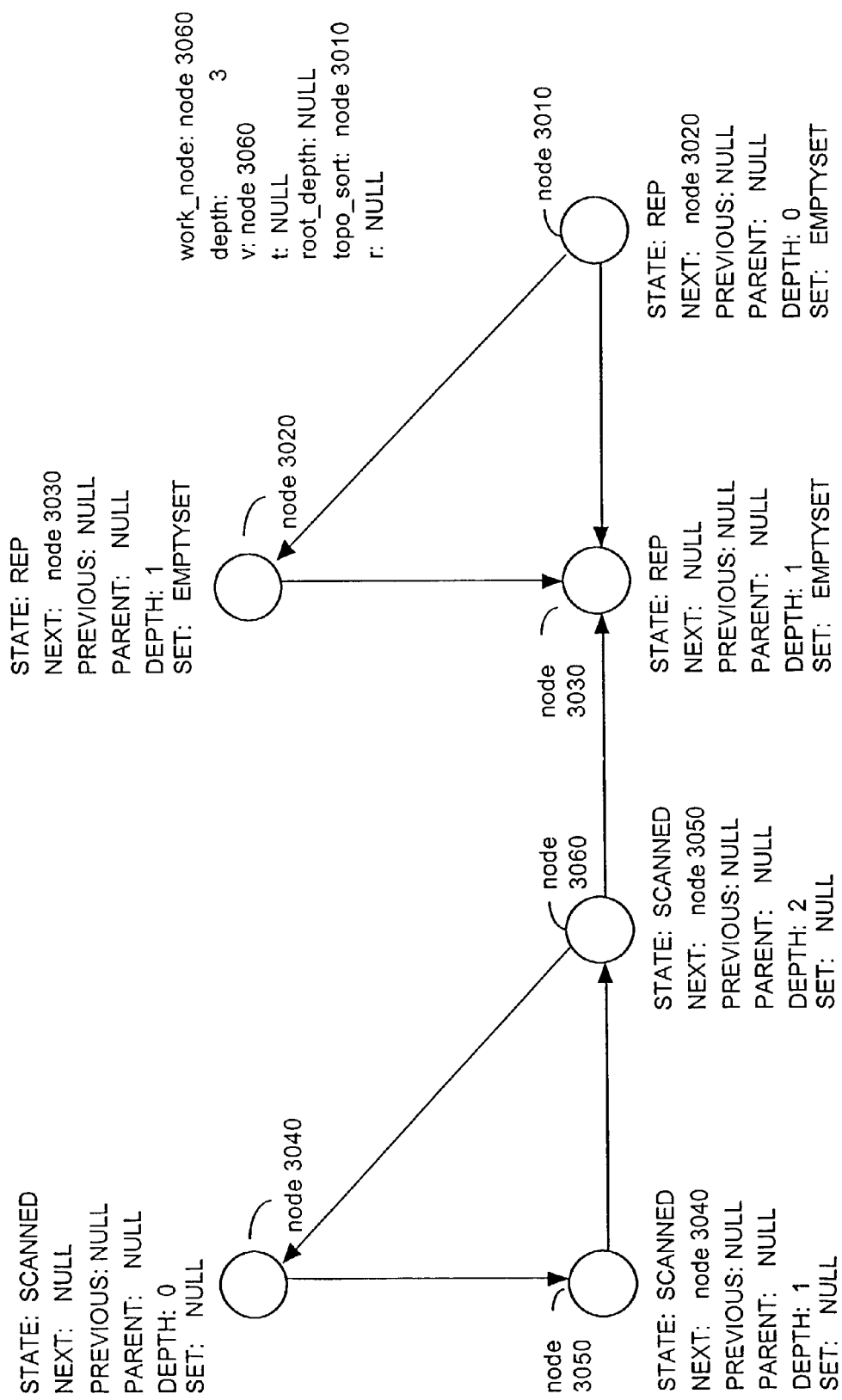

Program flow then returns to the top of the while loop, where the value of the variable work_node is tested. FIG. 11 indicates that the value of the variable work_node is node 3060 so the while loop is executed at least one more time. The while loop begins by resetting variable v to the variable work_node (e.g., node 3060) (ln. 6).

Program flow then enters the switch-case statement keyed to the state of variable v (e.g., node 3060). FIG. 11 indicates that the state assigned to the variable v (e.g., node 3060) is SCANNED. Thus, the variable work_node is set to v.next, which is node 3050, as indicated in FIG. 11 (ln. 32). Additionally, the variable depth is reduced to a value of two (ln. 33); variable root_depth is set to the variable depth (e.g., two) (ln. 34); and variable t is set to the variable v (e.g., node 3060) (ln. 35).

Program flow then enters a for-all loop that is executed for each node accessible from variable v (e.g., node 3060) (lns. 12-29). As illustrated in FIG. 11, nodes 3030 and 3040 are accessible from node 3060. Though no particular order is required, the nodes accessible from node 3060 are processed in accordance with the identifier assigned to each node. Accordingly, node 3030 is processed first.

The variable w (e.g., node 3030) is passed to the subroutine root, which returns a parent node of node 3030 (ln. 37). The subroutine root, which is described in detail above, returns node 3030 to the variable r in this instance.

The state and depth of the variable r (e.g., node 3030) are then compared to the state SCANNED and the variable root_depth respectively (ln. 38). If the depth of the variable r (e.g., node 3030) is not less than the value of the variable root_depth or the state of the variable r (e.g., node 3030) does not equal SCANNED, the analysis code 119 included in the if statement beginning at line 38 is not executed. In this instance, the state of the variable r (e.g., node 3030) is REP so this section of the analysis code 119 is not executed.

The for-all loop repeats, and the variable w (e.g., node 3040) is passed to the subroutine root, which returns a parent node of node 3040 (ln. 37). The subroutine root, which is described in detail above, returns node 3040 to the variable r in this instance.

The state and depth of the variable r (e.g., node 3040) are then compared to the state SCANNED and the variable root_depth respectively (ln. 38). If the depth of the variable r (e.g., node 3040) is less than the value of the variable root_depth and the state of the variable r (e.g., node 3040) equals SCANNED, the analysis code 119 included in the if statement beginning at line 38 is executed. In this instance, both of these conditions are met so this section of the analysis code 119 is executed. Specifically, the variable root_depth is set to the depth of the variable r (e.g., the depth value assigned to node 3040), which is 0, and the variable t is set to the variable r (e.g., node 3040) (lns. 39-40).

Next, the virtual machine 118 compares the value of the variable t to the value of variable v (ln. 43). If they are equal, lines 44-47 are executed. Because the analysis code 119 included in the for-all loop beginning at line 36 was executed, the two are no longer equal. Accordingly, the state of variable v (e.g., node 3060) is set to DONE (ln. 50) and the parent pointer of variable v (e.g., node 3060) is set to the variable t (e.g., node 3040) (ln. 51). After executing the steps described in the current and two previous paragraphs, the values associated with the variables included in FIG. 11 reflect the values illustrated in FIG. 12.

Figure 12:
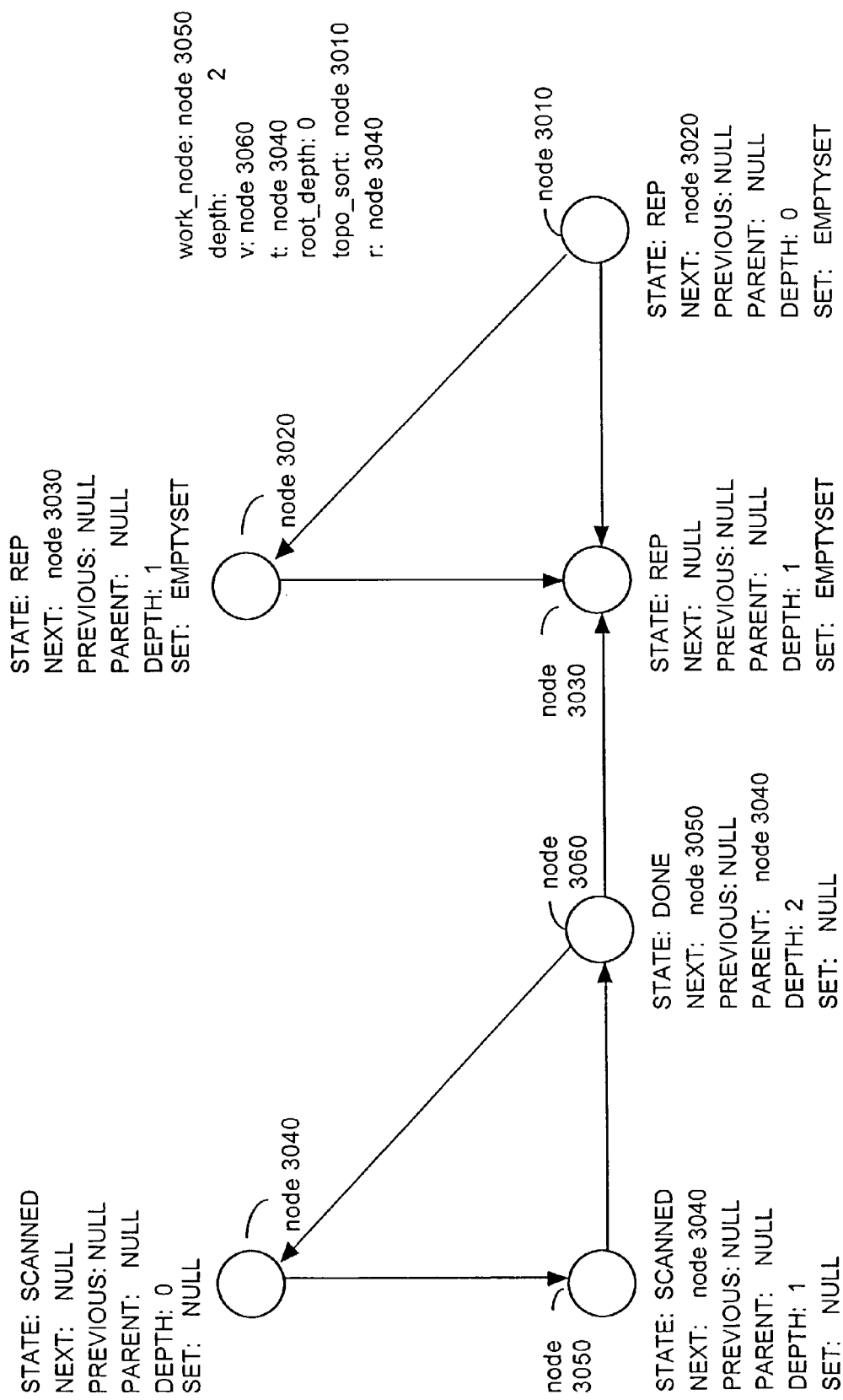

Program flow then returns to the top of the while loop, where the value of the variable work_node is tested. FIG. 12 indicates that the value of the variable work_node is node 3050 so the while loop is executed at least one more time. The while loop begins by resetting variable v to the variable work_node (e.g., node 3050) (ln. 6).

Program flow then enters the switch-case statement keyed to the state of variable v (e.g., node 3050). FIG. 12 indicates that the state assigned to the variable v (e.g., node 3050) is SCANNED. Thus, the variable work_node is set to v.next, which is node 3040, as indicated in FIG. 12 (ln. 32). Additionally, the variable depth is reduced to a value of one (ln. 33); variable root_depth is set to the variable depth (e.g., one) (ln. 34); and variable t is set to the variable v (e.g., node 3050) (ln. 35).

Program flow then enters a for-all loop that is executed for each node accessible from variable v (e.g., node 3050) (lns. 12-29). As illustrated in FIG. 12, node 3060 is accessible from node 3050. The for-all loop begins by passing the variable w (e.g., node 3060) to the subroutine root, which returns a parent node of node 3060 (ln. 37). The subroutine root, which is described in detail above, returns node 3040 to the variable r in this instance.

The state and depth of the variable r (e.g., node 3040) are then compared to the state SCANNED and the variable root_depth respectively (ln. 38). If the depth of the variable r (e.g., node 3040) is less than the value of the variable root_depth and the state of the variable r (e.g., node 3040) equals SCANNED, the analysis code 119 included in the if statement beginning at line 38 is executed. In this instance, both of these conditions are met so this section of the analysis code 119 is executed. Specifically, the variable root_depth is set to the depth of the variable r (e.g., the depth value assigned to node 3040), which is 0, and the variable t is set to the variable r (e.g., node 3040) (lns. 39-40).

Next, the virtual machine 118 compares the value of the variable t to the value of variable v (ln. 43). If they are equal, lines 44-47 are executed. Because the analysis code 119 included in the for-all loop beginning at line 36 was executed, the two are no longer equal. Accordingly, the state of variable v (e.g., node 3050) is set to DONE (ln. 50) and the parent pointer of variable v (e.g., node 3050) is set to the variable t (e.g., node 3040) (ln. 51). After executing the steps described in the current and four previous paragraphs, the values associated with the variables included in FIG. 12 reflect the values illustrated in FIG. 13.

Figure 13:
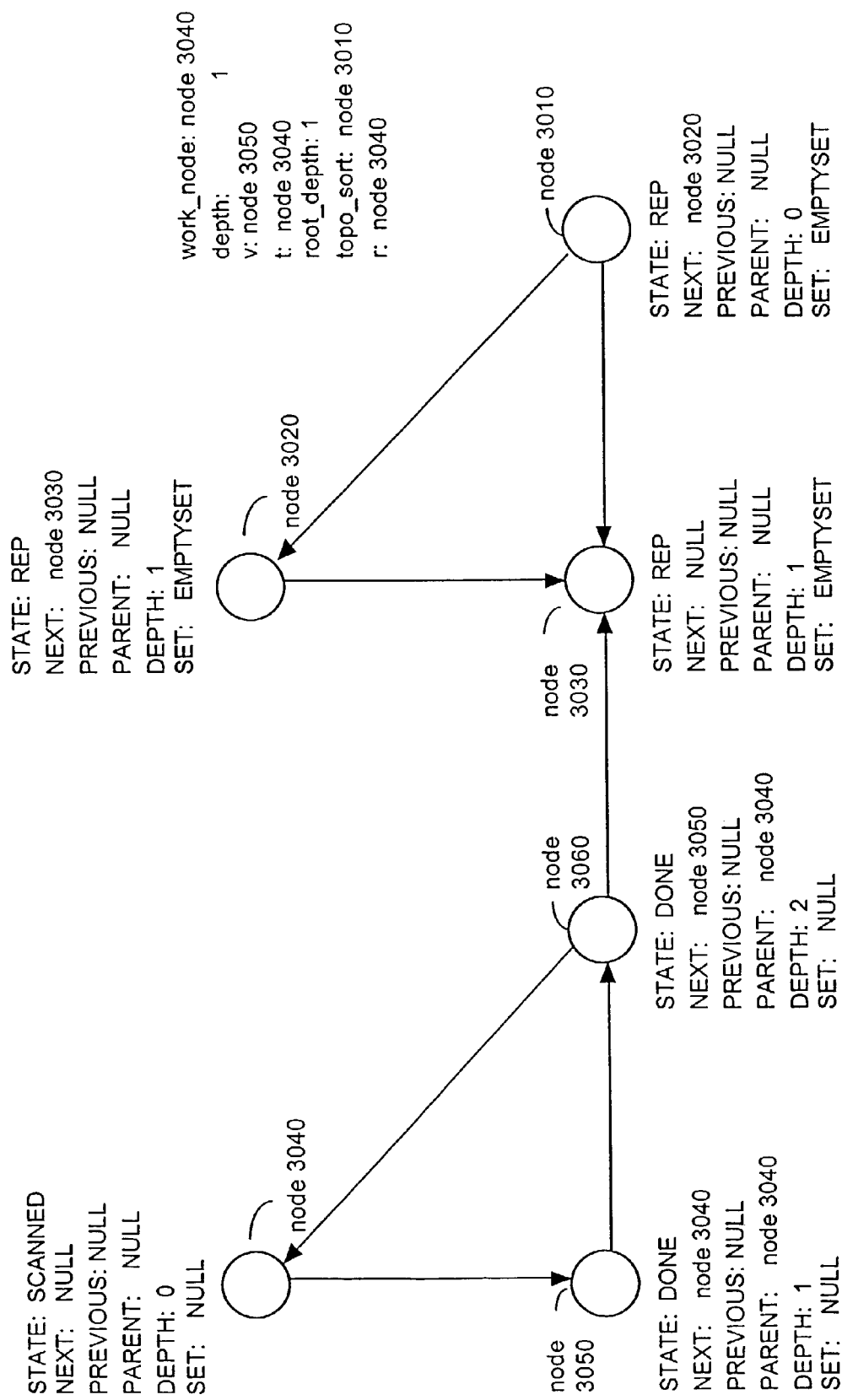

Program flow then returns to the top of the while loop, where the value of the variable work_node is tested. FIG. 13 indicates that the value of the variable work_node is node 3040 so the while loop is executed at least one more time. The while loop begins by resetting variable v to the variable work_node (e.g., node 3040) (ln. 6).

Program flow then enters the switch-case statement keyed to the state of variable v (e.g., node 3040). FIG. 13 indicates that the state assigned to the variable v (e.g., node 3040) is SCANNED. Thus, the variable work_node is set to v.next, which is NULL, as indicated in FIG. 13 (ln. 32). Additionally, the variable depth is reduced to a value of zero (ln. 33); variable root_depth is set to the variable depth (e.g., zero) (ln. 34); and variable t is set to the variable v (e.g., node 3040) (ln. 35).

Program flow then enters a for-all loop that is executed for each node accessible from variable v (e.g., node 3040) (lns. 12-29). As illustrated in FIG. 13, node 3050 is accessible from node 3040. The for-all loop begins by passing the variable w (e.g., node 3050) to the subroutine root, which returns a parent node of node 3050 (in. 37). The subroutine root, which is described in detail above, returns node 3040 to the variable r in this instance.

The state and depth of the variable r (e.g., node 3040) are then compared to the state SCANNED and the variable root_depth respectively (ln. 38). If the depth of the variable r (e.g., node 3040) is not less than the value of the variable root_depth or the state of the variable r (e.g., node 3040) does not equal SCANNED, the analysis code 119 included in the if statement beginning at line 38 is not executed. In this instance, the depth of the variable r (e.g., node 3040) is equal to root_depth so this section of the analysis code 119 is not executed.

Next, the virtual machine 118 compares the value of the variable t to the value of variable v (ln. 43). If they are equal, lines 44-47 are executed. Because the analysis code 119 included in the for-all loop beginning at line 36 was not executed, the two remain equal. Accordingly, the state of variable v (e.g., node 3040) is set to REP (ln. 44); the set of variable v (e.g., node 3040) is set to EMPTYSET (ln. 45); the next-node pointer of variable v (e.g., node 3040) is set to the variable topo_sort (e.g., node 3010) (ln. 46); and the variable topo_sort is set to the variable v (e.g., node 3040) (ln. 47). After executing the steps described in the current and six previous paragraphs, the values associated with the variables included in FIG. 13 reflect the values illustrated in FIG. 14.

Figure 14:
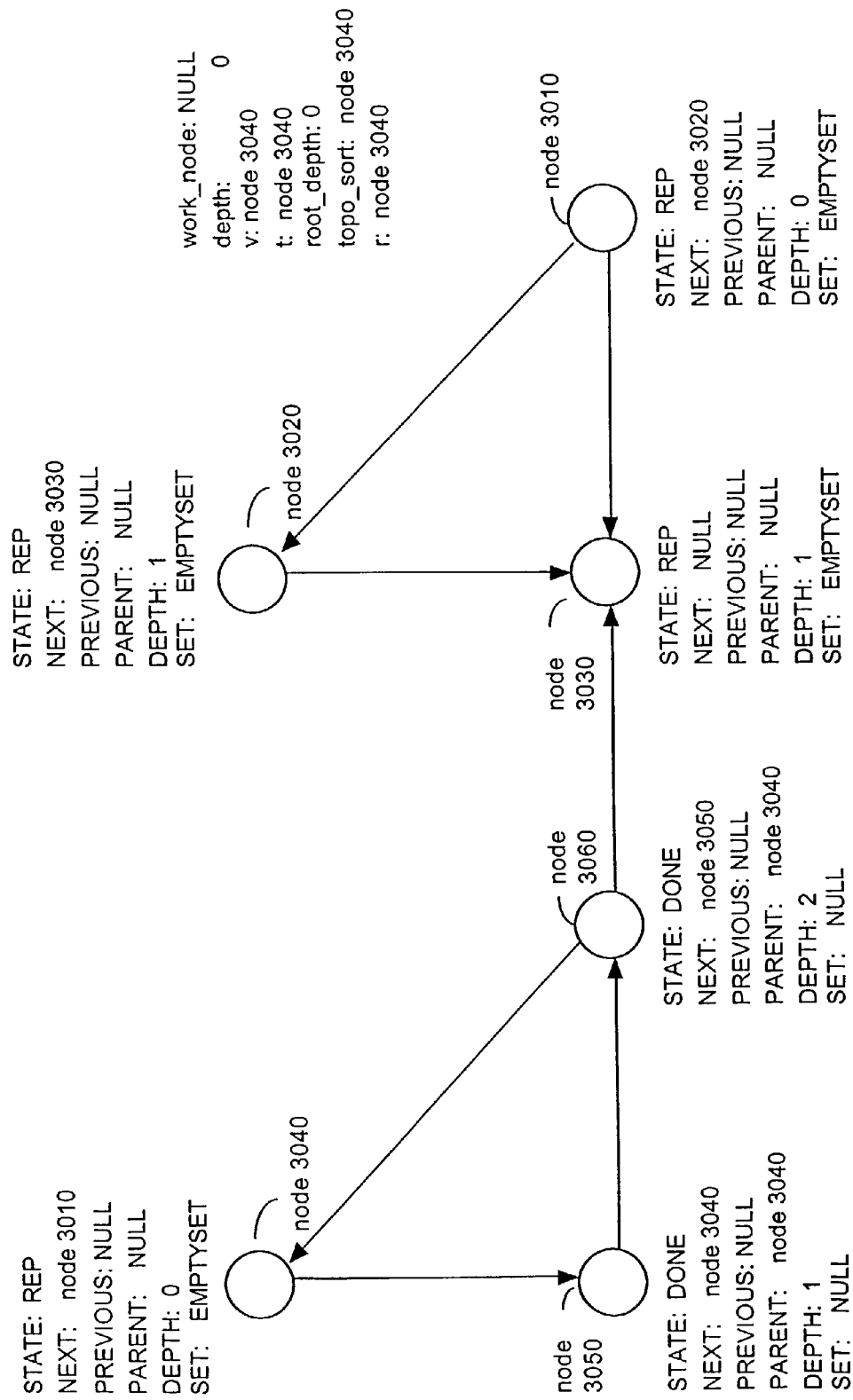

Program flow then returns to the top of the while loop, where the value of the variable work_node is tested. FIG. 14 indicates that the value of the variable work_node is NULL so program flow jumps to line 56, which returns the value of the variable topo_sort (e.g., node 3040) to the calling routine doit. In the present example, no additional root nodes are available so control passes to the for-all loop beginning at line 104. This loop initializes application sets for nodes directly reachable from each application. After completing this loop, the set variable of node 3010 and node 3040 are set to applications 116-0 and application 116-02 respectively.

Control then passes to the subroutine pass2 with the variable topo_sort (e.g., node 3040) as an argument. The subroutine pass2 computes the amount of memory associated with each application set. And in the process returns each node to the NULL state. In operation, the subroutine pass (2) proceeds by flowing application sets from each set of SCC in turn, in topological sort order.

The execution of the subroutine pass2 begins at line 58 of Appendix A. The analysis code 119 included in the pass2 subroutine executes within a while loop so long as the variable topo_sort does not equal NULL (lns. 59-86).

The while loop loops across representatives of a set of SCC in topological sort order. And begins by setting variable root to reference the variable topo_sort (e.g., node 3040) (ln. 60). The variable topo_sort is then set to root.next (e.g., the next-node pointer of node 3040), which, as indicated by FIG. 14, is node 3010 (ln. 61).

Flow calculation at the current representative of a set of SCC is then initialized. Specifically, the variable s is set to root.set (e.g., the set value of node 3040), which is application 116-2 (ln. 62). The variable work_node is then set to the variable root (e.g., node 3040) and the state of the variable root (e.g., node 3040) is set to FLOWING (ln. 63). After executing lines 60-64, the values associated with the variables included in FIG. 14 reflect the values illustrated in FIG. 15.

Each node in the set of SCC is then processed in a while loop beginning at line 65. The while loop begins by setting variable v to the variable work_node (e.g., node 3040) (ln. 66). Then the variable work_node is set to v.next (e.g., node 3010) (ln. 67). Additionally, the variable s (e.g., application 116-2) is set to include the variable v (e.g., node 3040) (ln. 68). In other words, the memory usage of node 3040 is added to the memory usage ultimately accorded to application 116-2.

Figure 15:
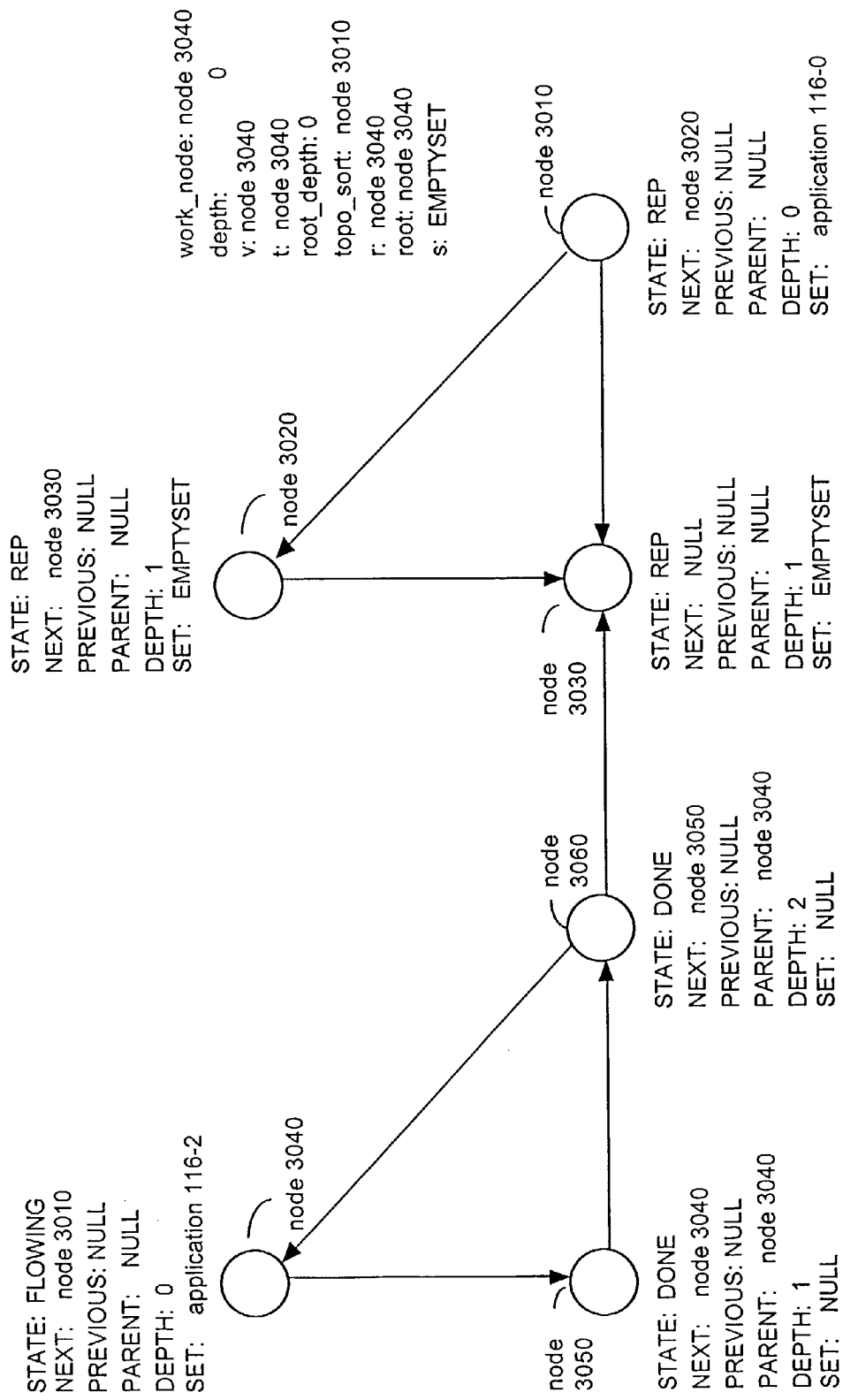

The nodes directly accessible from variable v (e.g., node 3040) are then processed in a for-all loop beginning at line 69. As illustrated in FIG. 15, node 3050 is directly accessible from node 3040 so processing begins with a switch-case statement keyed to the state of variable w (e.g., node 3050) (ln. 70). Because the state of variable w (e.g., node 3050) is DONE, variable r is set to the value returned by the subroutine root after being called with variable w (e.g., node 3050) as an argument (ln. 74). Given the state of the various variables of w (e.g., node 3050) and its parent nodes, root returns node 3040 to the variable r.

If the state of the variable r (e.g., node 3040) is REP, the set of the variable r (e.g., node 3040) is set to include s (e.g., application 116-2) (ln. 75). However, the state of the variable r (e.g., node 3040) is FLOWING so the state of variable w (e.g., node 3050) is set to FLOWING; the next-node pointer of variable w (e.g., node 3050) is set to the variable work_node (e.g., 3010); and work_node is set to the variable w (e.g., node 3050) (lns. 77-79).

Control then passes from the for-all loop beginning at line 69 to line 84, where the state of variable v (e.g., node 3040) is set to NULL. This line marks the end of the analysis code 119 included in the while loop beginning at line 65. After completing this loop (as described in the current and three previous paragraphs), the values associated with the variables included in FIG. 15 reflect the values illustrated in FIG. 16.

Figure 16:
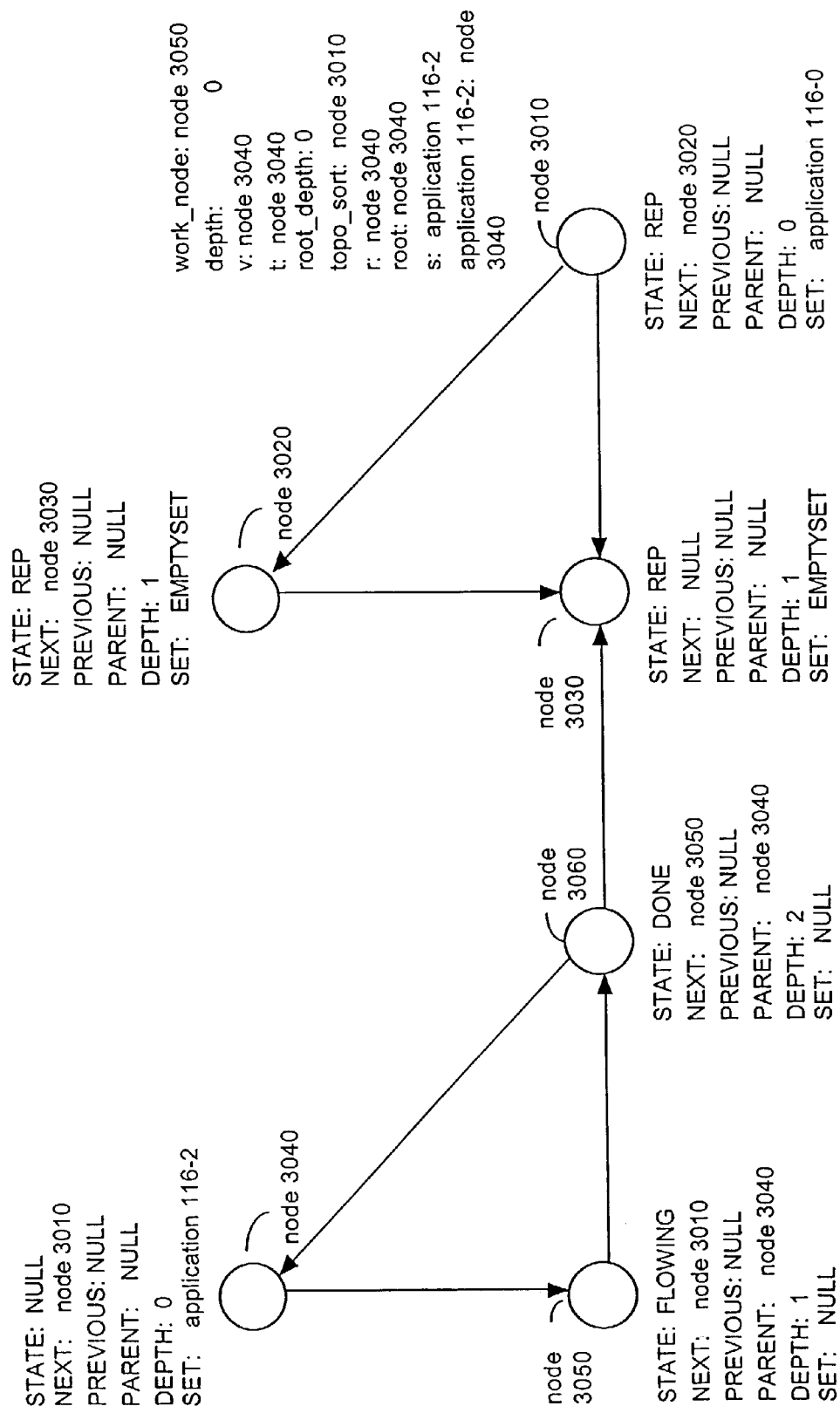

Program flow then returns to the top of the while loop, where the value of the variable work_node is tested. FIG. 16 indicates that the value of the variable work_node is node 3050 and the variable topo_sort is node 3010. In other words, additional nodes are included in the set of SCC. The while loop begins by setting variable v to the variable work_node (e.g., node 3050) (ln. 66). Then the variable work_node is set to v.next (e.g., node 3010) (ln. 67). Additionally, the variable s (e.g., application 116-2) is set to include the variable v (e.g., node 3050) (ln. 68). In other words, the memory usage of node 3050 is added to the memory usage ultimately accorded to application 116-2.

The nodes directly accessible from variable v (e.g., node 3050) are then processed in a for-all loop beginning at line 69. As illustrated in FIG. 16, node 3060 is directly accessible from node 3050 so processing begins with a switch-case statement keyed to the state of variable w (e.g., node 3060) (ln. 70). Because the state of variable w (e.g., node 3060) is DONE, variable r is set to the value returned by the subroutine root after being called with variable w (e.g., node 3060) as an argument (ln. 74). Given the state of the various variables of w (e.g., node 3060) and its parent nodes, root returns node 3040 to the variable r.

If the state of the variable r (e.g., node 3040) is REP, the set of the variable r (e.g., node 3040) is set to include the variable s (e.g., application 116-2) (ln. 75). However, the state of the variable r (e.g., node 3040) is NULL so the state of variable w (e.g., node 3060) is set to FLOWING; the next-node pointer of variable w (e.g., node 3050) is set to the variable work_node (e.g., 3010); and work_node is set to the variable w (e.g., node 3050) (lns. 77-79).

Control then passes from the for-all loop beginning at line 69 to line 84, where the state of variable v (e.g., node 3050) is set to NULL. This line marks the end of the analysis code 119 included in the while loop beginning at line 65. After completing this loop (as described in the current and three previous paragraphs), the values associated with the variables included in FIG. 16 reflect the values illustrated in FIG. 17.

Figure 17:
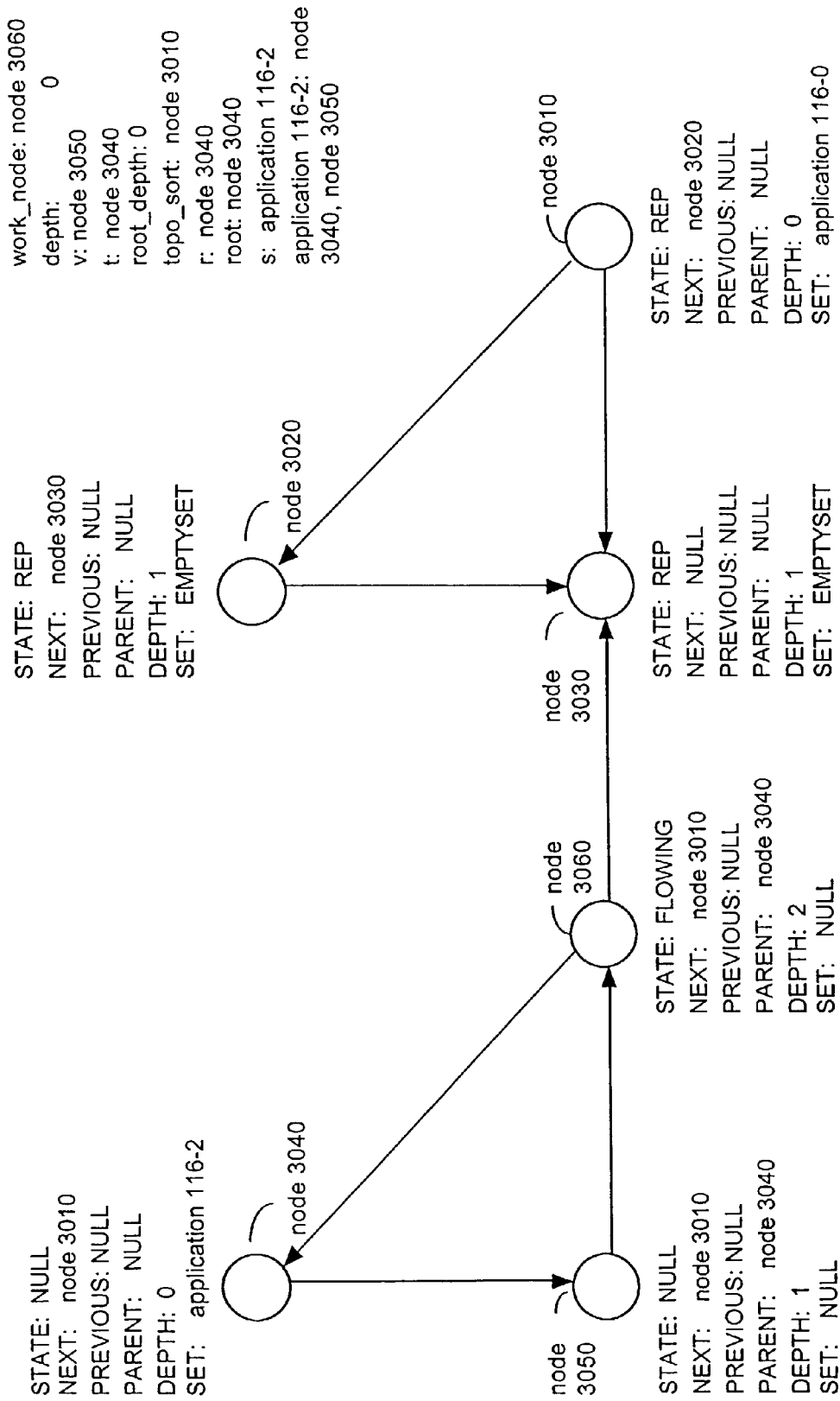

Program flow then returns to the top of the while loop, where the value of the variable work_node is tested. FIG. 17 indicates that the value of the variable work_node is node 3060. In other words, additional nodes are included in the set of SCC. The while loop begins by setting variable v to the variable work_node (e.g., node 3060) (ln. 66). Then the variable work_node is set to v.next (e.g., node 3010) (ln. 67). Additionally, the variable s (e.g., application 116-2) is set to include the variable v (e.g., node 3060) (ln. 68). In other words, the memory usage of node 3060 is added to the memory usage ultimately accorded to application 116-2.

The nodes directly accessible from variable v (e.g., node 3060) are then processed in a for-all loop beginning at line 69. As illustrated in FIG. 17, nodes 3030 and 3040 are directly accessible from node 3060. Though no particular order is required, the nodes accessible from node 3060 are processed in accordance with the identifier assigned to each node. Accordingly, processing begins with a switch-case statement keyed to the state of variable w (e.g., node 3030) (ln. 70). Because the state of variable w (e.g., node 3030) is REP, variable r is set to the value returned by the subroutine root after being called with variable w (e.g., node 3030) as an argument (ln. 74). Given the state of the various variables of w (e.g., node 3030), root returns node 3030 to the variable r. Because the state of the variable r (e.g., node 3030) is REP, the set of the variable r (e.g., node 3030) is set to include the variable s (e.g., application 116-2) (ln. 75).

The for-all loop beginning at line 69 is then executed again, beginning with the switch-case statement keyed to the state of variable w (e.g., node 3040) (ln. 70). Because the state of variable w (e.g., node 3040) is NULL, the switch-case statement and the for-all loop are exited (ln. 72).

Control then passes from the for-all loop beginning at line 69 to line 84, where the state of variable v (e.g., node 3060) is set to NULL. This line marks the end of the analysis code 119 included in the while loop beginning at line 65. After completing this loop (as described in the current and three previous paragraphs), the values associated with the variables included in FIG. 17 reflect the values illustrated in FIG. 18.

Figure 18:
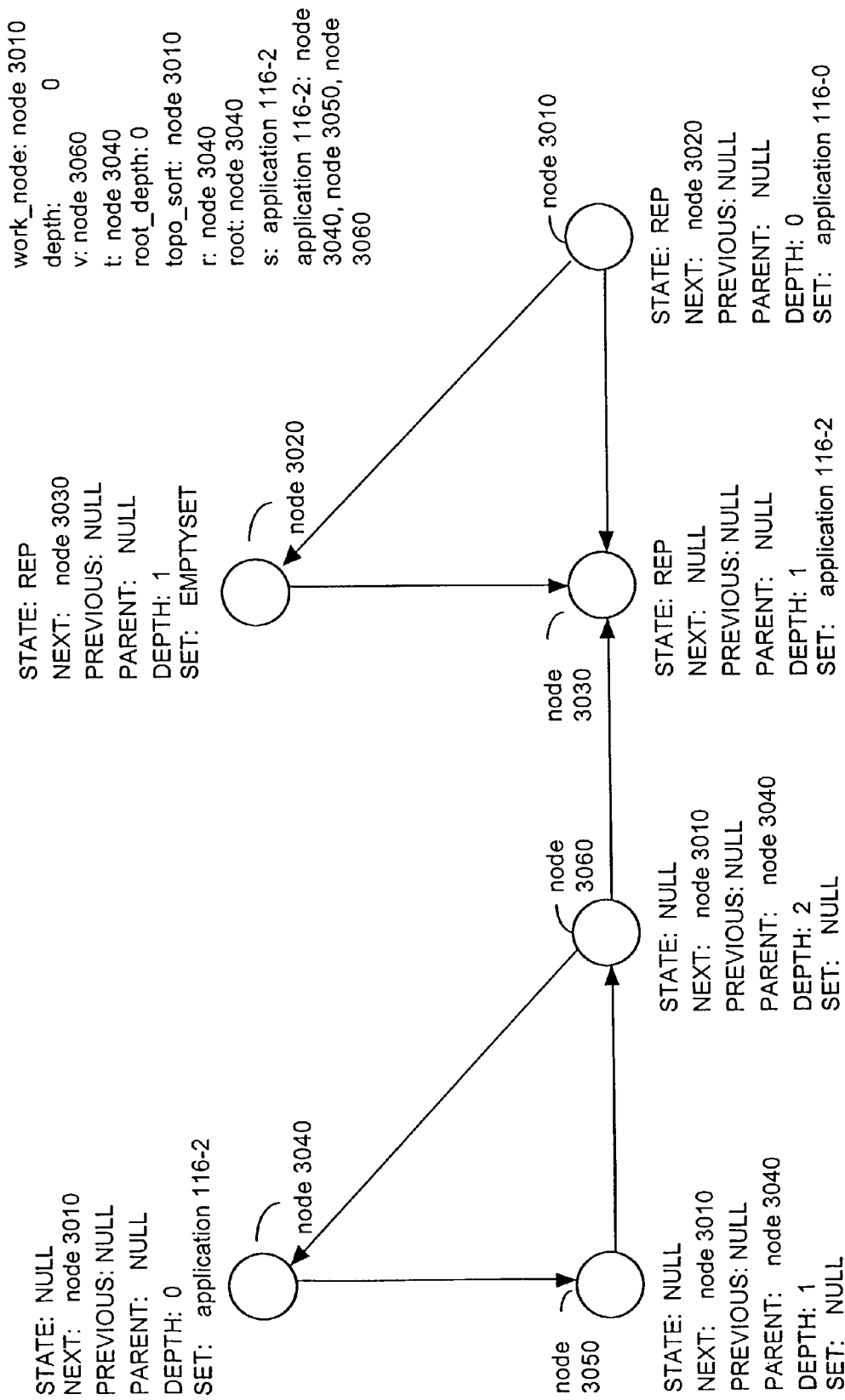

Program flow then returns to the top of the while loop beginning at line 65 where the value of the variable work_node is tested against the variable topo_sort. FIG. 18 indicates that the value of the variable work_node is equal to the variable topo_sort. In other words, no additional nodes are included in the current set of SCC. Accordingly, the current while loop is exited, and program flow returns to the top of the while loop beginning at line 59 where the value of the variable topo_sort is tested against NULL. FIG. 18 indicates that the value of the variable topo_sort is node 3010. The while loop beginning at line 59 is therefore executed at least one more time.

The while loop begins by setting variable root to reference the variable topo_sort (e.g., node 3010) (ln. 60). The variable topo_sort is then set to root.next (e.g., the next-node pointer of node 3010), which, as indicated by FIG. 18, is node 3020 (ln. 61).

Flow calculation at the current representative of a set of SCC is then initialized. Specifically, the variable s is set to root.set (e.g., the set value of node 3010), which is application 116-0 (ln. 62). The variable work_node is then set to the variable root (e.g., node 3010) and the state of the variable root (e.g., node 3010) is set to FLOWING (ln. 63). After executing lines 60-64, the values associated with the variables included in FIG. 18 reflect the values illustrated in FIG. 19.

Each node in the set of SCC (or until work_node equals the variable topo_sort) is then processed in a while loop beginning at line 65. The while loop begins by setting variable v to the variable work_node (e.g., node 3010) (ln. 66). Then the variable work_node is set to v.next (e.g., node 3020) (ln. 67). Additionally, the variable s (e.g., application 116-0) is set to include the variable v (e.g., node 3010) (ln. 68). In other words, the memory usage of node 3010 is added to the memory usage ultimately accorded to application 116-0.

The nodes directly accessible from variable v (e.g., node 3010) are then processed in a for-all loop beginning at line 69.

Figure 19:
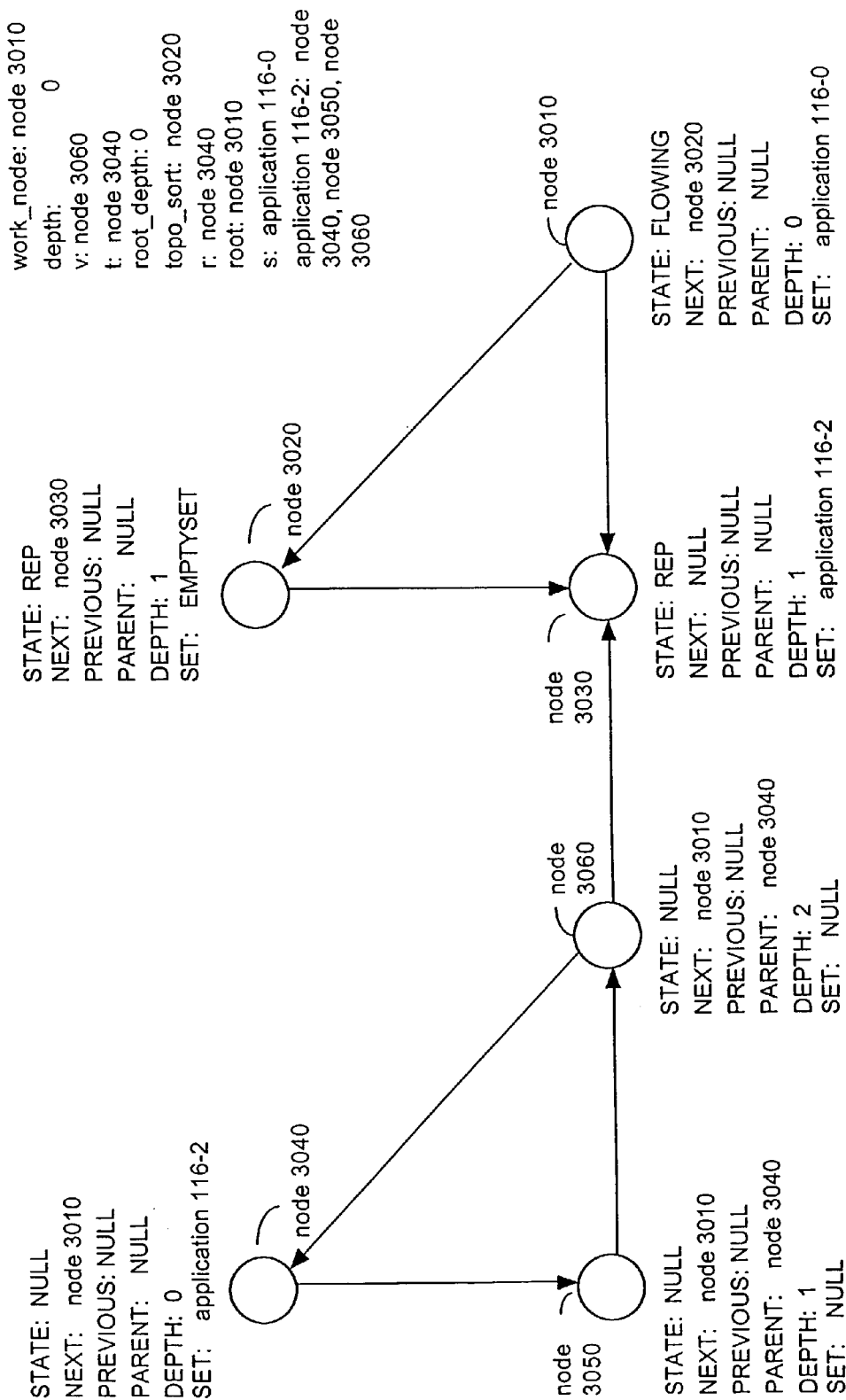

As illustrated in FIG. 19, nodes 3020 and 3030 are directly accessible from node 3010. Though no particular order is required, the nodes accessible from node 3060 are processed in accordance with the identifier assigned to each node. Accordingly, processing begins with a switch-case statement keyed to the state of variable w (e.g., node 3020) (ln. 70). Because the state of variable w (e.g., node 3020) is REP, variable r is set to the value returned by the subroutine root after being called with variable w (e.g., node 3020) as an argument (ln. 74). Given the state of the various variables of w (e.g., node 3020), root returns node 3020 to the variable r. Because the state of the variable r (e.g., node 3020) is REP, the set of the variable r (e.g., node 3020) is set to include the variable s (e.g., application 116-0) (ln. 75).

The for-all loop beginning at line 69 is then executed again, beginning with the switch-case statement keyed to the state of variable w (e.g., node 3030) (ln. 70). Because the state of variable w (e.g., node 3030) is REP, variable r is set to the value returned by the subroutine root after being called with variable w (e.g., node 3030) as an argument (ln. 74). Given the state of the various variables of w (e.g., node 3030), root returns node 3030 to the variable r. Because the state of the variable r (e.g., node 3030) is REP, the set of the variable r (e.g., node 3030) is set to include the variable s (e.g., application 116-0) (ln. 75).

Control then passes from the for-all loop beginning at line 69 to line 84, where the state of variable v (e.g., node 3010) is set to NULL. This line marks the end of the analysis code 119 included in the while loop beginning at line 65. After completing this loop (as described in the current and three previous paragraphs), the values associated with the variables included in FIG. 19 reflect the values illustrated in FIG. 20.

Figure 20:
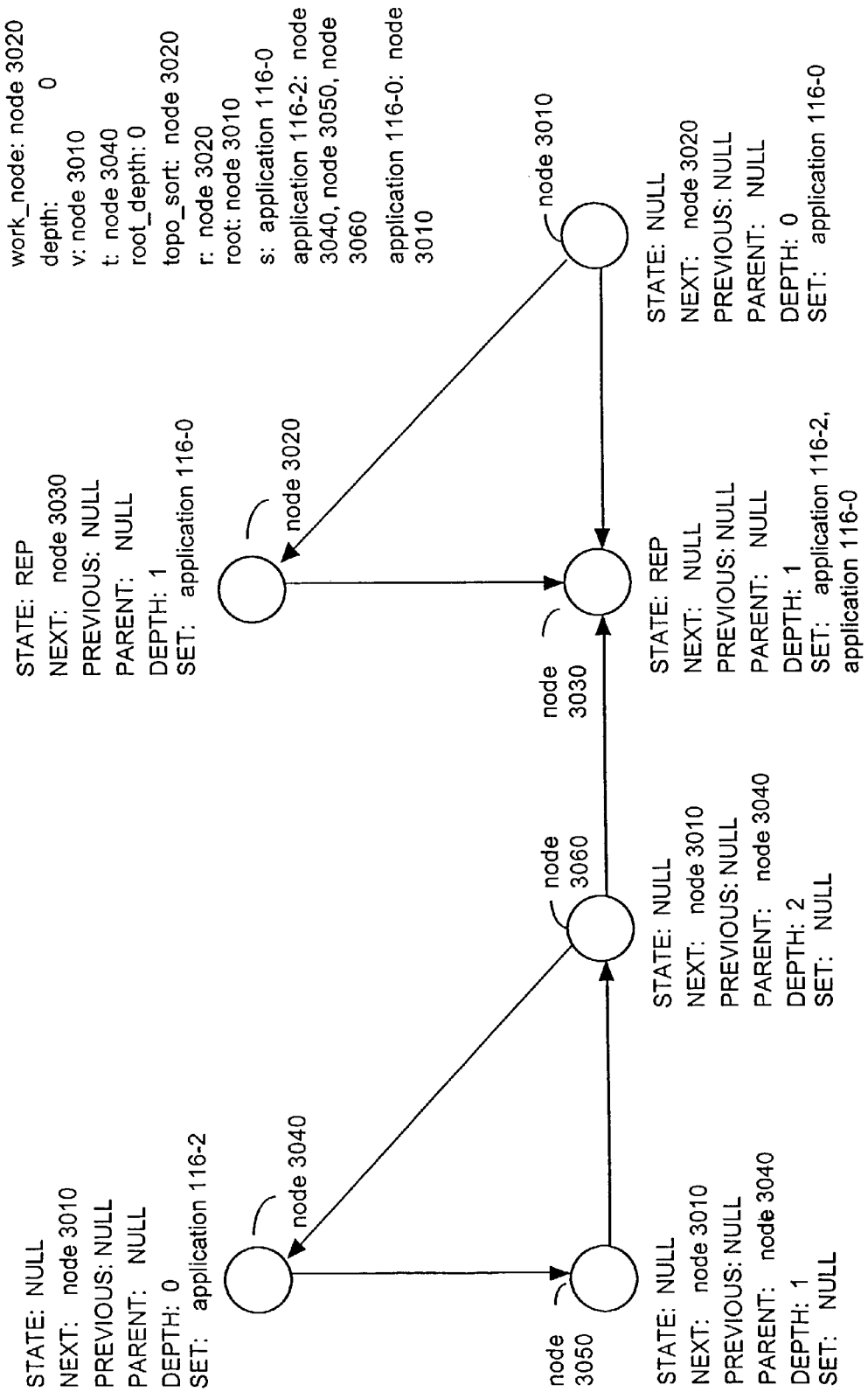

Program flow then returns to the top of the while loop beginning at line 65 where the value of the variable work_node is tested against the variable topo_sort. FIG. 20 indicates that the value of the variable work_node is equal to the variable topo_sort. In other words, no additional nodes are included in the current set of SCC. Accordingly, the current while loop is exited, and program flow returns to the top of the while loop beginning at line 59 where the value of the variable topo_sort is tested against NULL. FIG. 20 indicates that the value of the variable topo_sort is node 3020. The while loop beginning at line 59 is therefore executed at least one more time.

The while loop begins by setting variable root to reference the variable topo_sort (e.g., node 3020) (ln. 60). The variable topo_sort is then set to root.next (e.g., the next-node pointer of node 3020), which, as indicated by FIG. 20, is node 3030 (ln. 61).

Flow calculation at the current representative of a set of SCC is then initialized. Specifically, the variable s is set to root.set (e.g., the set value of node 3020), which is application 116-0 (ln. 62). The variable work_node is then set to the variable root (e.g., node 3020) and the state of the variable root (e.g., node 3020) is set to FLOWING (ln. 63). After executing lines 60-64, the values associated with the variables included in FIG. 20 reflect the values illustrated in FIG. 21.

Each node in the set of SCC (or until work_node equals the variable topo_sort) is then processed in a while loop beginning at line 65. The while loop begins by setting variable v to the variable work_node (e.g., node 3020) (ln. 66). Then the variable work_node is set to v.next (e.g., node 3030) (ln. 67). Additionally, the variable s (e.g., application 116-0) is set to include the variable v (e.g., node 3020) (ln. 68). In other words, the memory usage of node 3020 is added to the memory usage ultimately accorded to application 116-0.

Figure 21:
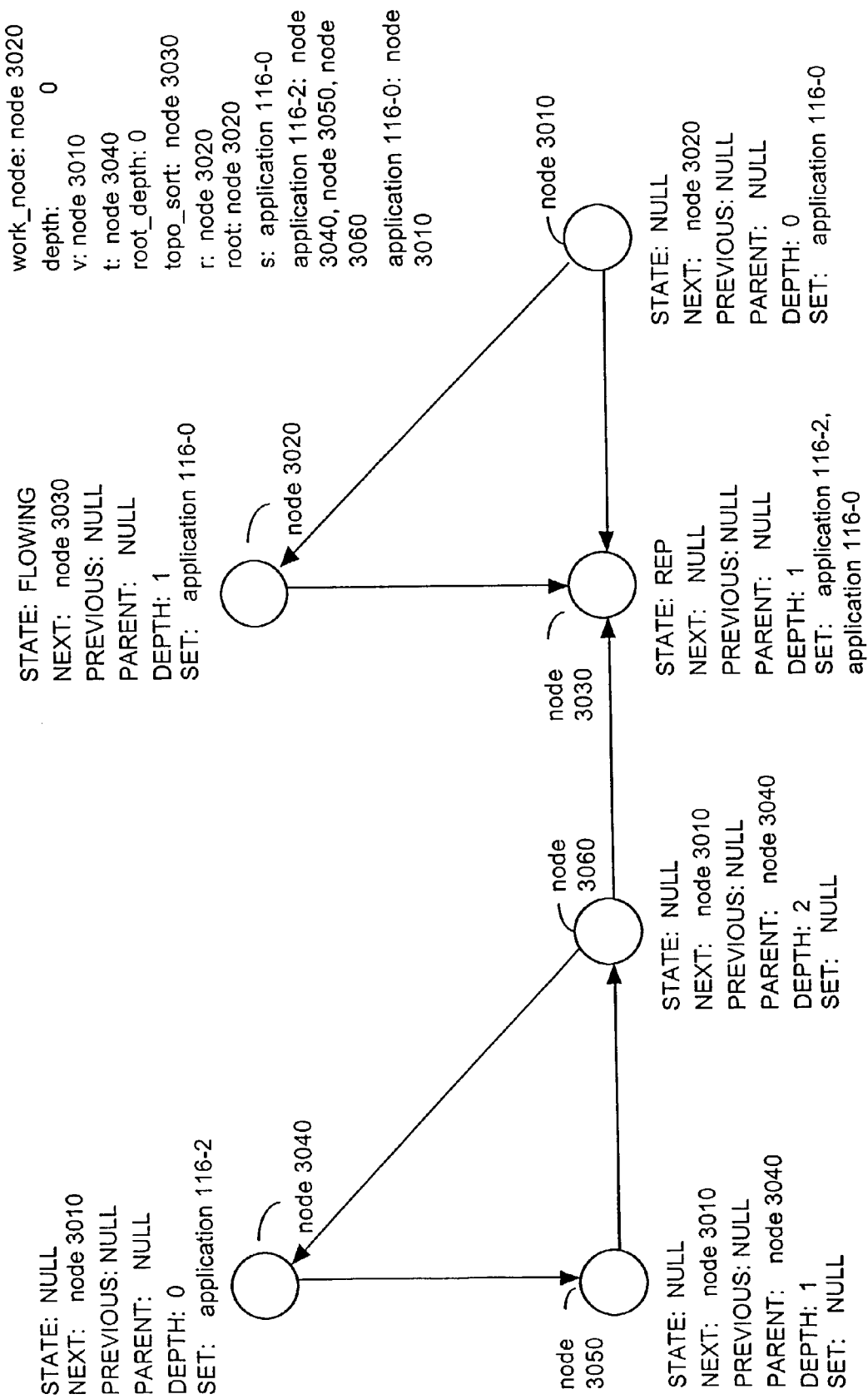

The nodes directly accessible from variable v (e.g., node 3010) are then processed in a for-all loop beginning at line 69. As illustrated in FIG. 21, node 3030 is directly accessible from node 3020 so processing begins with a switch-case statement keyed to the state of variable w (e.g., node 3030) (ln. 70). Because the state of variable w (e.g., node 3030) is REP, variable r is set to the value returned by the subroutine root after being called with variable w (e.g., node 3030) as an argument (ln. 74). Given the state of the various variables of w (e.g., node 3030), root returns node 3030 to the variable r. Because the state of the variable r (e.g., node 3030) is REP, the set of the variable r (e.g., node 3030) is set to include the variable s (e.g., application 116-0) (ln. 75).

Control then passes from the for-all loop beginning at line 69 to line 84, where the state of variable v (e.g., node 3020) is set to NULL. This line marks the end of the analysis code 119 included in the while loop beginning at line 65. After completing this loop (as described in the current and two previous paragraphs), the values associated with the variables included in FIG. 21 reflect the values illustrated in FIG. 22.

Figure 22:
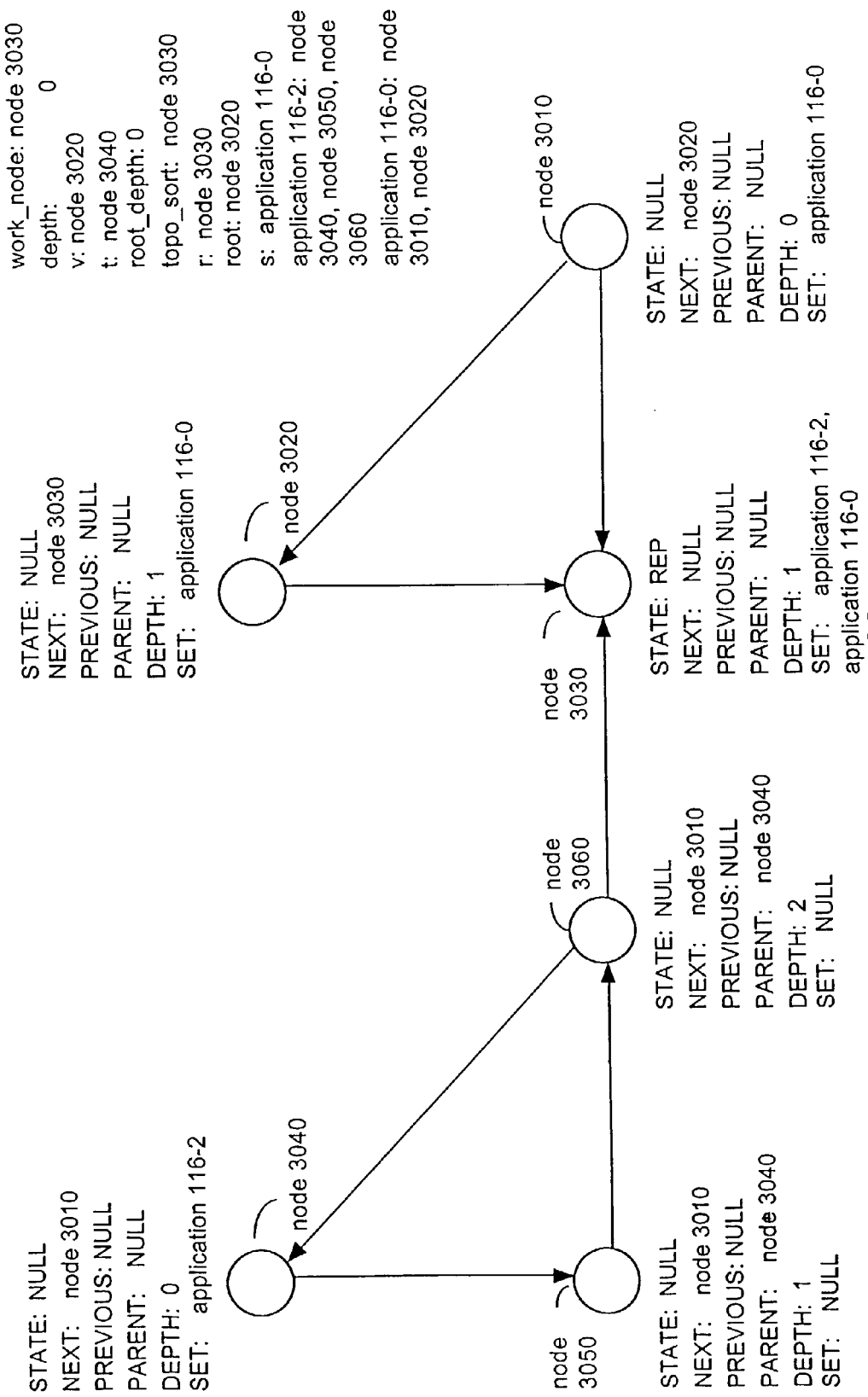

Program flow then returns to the top of the while loop beginning at line 65 where the value of the variable work_node is tested against the variable topo_sort. FIG. 22 indicates that the value of the variable work_node is equal to the variable topo_sort. In other words, no additional nodes are included in the current set of SCC. Accordingly, the current while loop is exited, and program flow returns to the top of the while loop beginning at line 59 where the value of the variable topo_sort is tested against NULL. FIG. 22 indicates that the value of the variable topo_sort is node 3030. The while loop beginning at line 59 is therefore executed at least one more time.

The while loop begins by setting variable root to reference the variable topo_sort (e.g., node 3030) (ln. 60). The variable topo_sort is then set to root.next (e.g., the next-node pointer of node 3030), which, as indicated by FIG. 22, is NULL (ln. 61).

Flow calculation at the current representative of a set of SCC is then initialized. Specifically, the variable s is set to root.set (e.g., the set value of node 3030), which is application 116-0, application 116-2 (ln. 62). The variable work_node is then set to the variable root (e.g., node 3030) and the state of the variable root (e.g., node 3030) is set to FLOWING (ln. 63). After executing lines 60-64, the values associated with the variables included in FIG. 22 reflect the values illustrated in FIG. 23.

Each node in the set of SCC (or until work_node equals the variable topo_sort) is then processed in a while loop beginning at line 65. The while loop begins by setting variable v to the variable work_node (e.g., node 3030) (ln. 66). Then the variable work_node is set to v.next (e.g., NULL) (ln. 67). Additionally, the variable s (e.g., application 116-2, application 116-0) is set to include the variable v (e.g., node 3030) (ln. 68). In other words, the memory usage of node 3030 is added to the memory usage ultimately accorded to application 116-2 and application 116-0.

Figure 23:
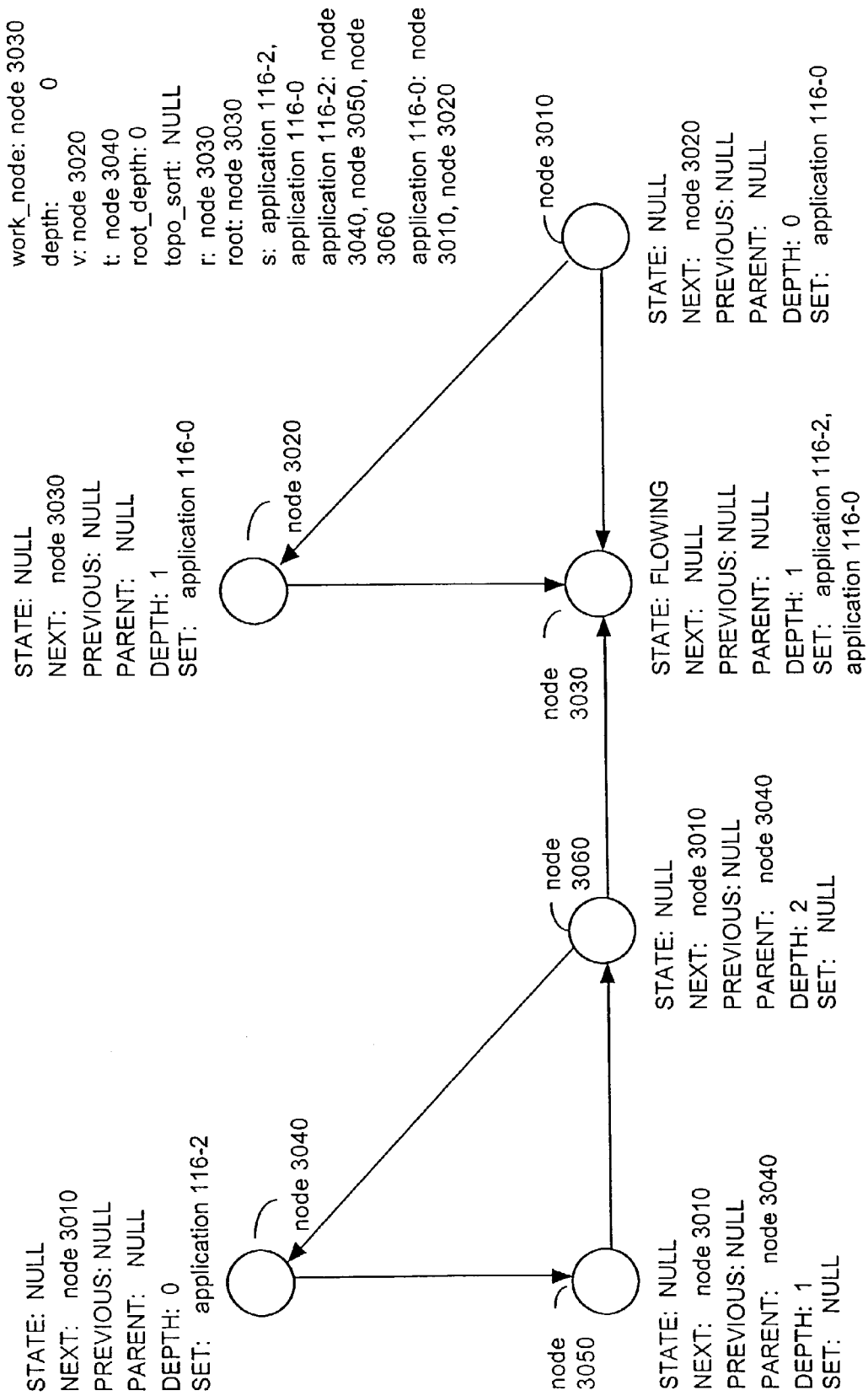

The nodes directly accessible from variable v (e.g., node 3010) are then processed in a for-all loop beginning at line 69. But as illustrated in FIG. 23, no nodes are directly accessible from node 3030. Accordingly, control passes from the for-all loop beginning at line 69 to line 84, where the state of variable v (e.g., node 3030) is set to NULL. This line marks the end of the analysis code 119 included in the while loop beginning at line 65. After completing this loop (as described in the current and two previous paragraphs), the values associated with the variables included in FIG. 23 reflect the values illustrated in FIG. 24.

Figure 24:
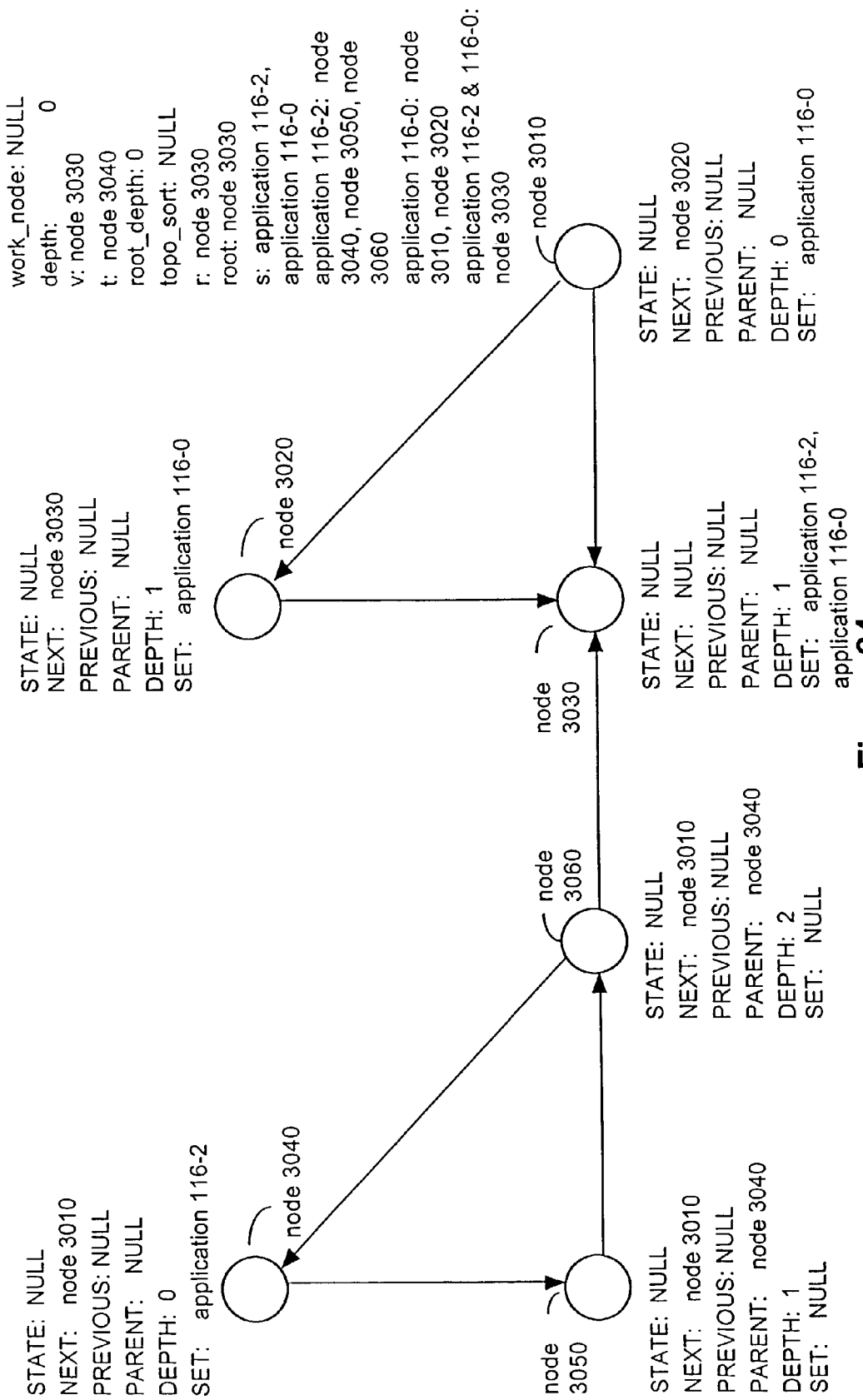

Program flow then returns to the top of the while loop beginning at line 65 where the value of the variable work_node is tested against the variable topo_sort. FIG. 24 indicates that the value of the variable work_node is equal to the variable topo_sort. In other words, no additional nodes are included in the current set of SCC. Accordingly, the current while loop is exited, and program flow returns to the top of the while loop beginning at line 59 where the value of the variable topo_sort is tested against NULL. FIG. 24 that the value of the variable topo_sort is NULL. Accordingly, the subroutine pass2 is exited and control passes back to the routine doit.

Assuming that each node included in FIGS. 2-24 is equal to a memory size of one arbitrary unit, application 116-2 is responsible for 3.5 units (e.g., all of nodes 3040, 3050, 3060 and one half of node 3030) and application 116-0 is responsible for 2.5 units (e.g., all of nodes 3010 and 3020 and one half of node 3030).

Triggering Measurement of Resource Usage

Depending on the particular embodiment, different events or conditions trigger the measurement of application 116 resource usage. For example, in some embodiments, the above described steps (or other steps consistent with the present invention) are executed each time a garbage collection routine is executed by a virtual machine 118. Persons skilled in the art recognize that a virtual machine typically executes a garbage collection routine, which frees unused, allocated resources (e.g., sections of the heap 114) and compacts the used, allocated resources. In still other embodiments, the above described steps (or other steps consistent with the present invention) are executed when the virtual machine 118 detects that resource availability is low. Other embodiments trigger the above described steps (or other steps consistent with the present invention) to run often while, for example, debugging an application 116 or virtual machine 118.

Enforcing Resource Usage Rules

In addition, some embodiments of the present invention also include a method of "punishing" applications 116 that consume too many resources. For example, in some embodiments, a virtual machine 118 measures resource usage and takes action when resource availability drops to a predefined level. In some of these embodiments, the virtual machine 118 may "punish" a particular application 116 that consumes a disproportionate share of resources is punished. In still other embodiments, the virtual machine 118 may "punish" a particular application 116 that consumes the most resources—not necessarily a disproportionate share of resources.

The present invention is not limited to any particular method of punishing an application. However, one method is to throw an OutOfMemoryError type of exception the next time a selected application 116 executes a memory allocation. Non-malicious applications 116 typically exit immediately or reduce resource usage in response to this type of exception. However, malicious applications 116 can, for example, catch and ignore such exceptions. The virtual machine 118 can, therefore, throw an InternalError type of exception each time the selected application 116 executes an instruction. Because throwing such exceptions can leave acquired locks in place while the virtual machine 118 is running, other methods include throwing such exceptions only at backward branches and recursive calls. This method can result in the release of additional locks before the selected application 116 exits.

The enforcement code 120 in Appendix B illustrates a method of enforcing resource usage rules. The enforcement code 120 includes a call to the doit routine included in Appendix A and described in detail above.

The enforcement code 120 in Appendix B begins with an if statement that compares the amount of free memory in a heap 114 owned by a particular virtual machine 118 to a predefined threshold (ln. 2). If the free heap memory is greater than the predefined threshold, the procedure exits without taking further action (ln. 3).

If, however, the free heap memory is not greater than the predefined threshold, the doit routine is called and executed as described above (in. 6). To simplify discussion, it is assumed that the heap 114, including the variables associated with the various nodes (e.g. objects 122) illustrated in FIG. 24, result from this call to the doit routine.

Next, a for-all loop and a nested for-all loop are executed to compute the resources for which each application 116 is responsible (lns. 7-11). The first for-all loop cycles through each application group identified in the pass2 routine described above. As indicated in FIG. 24, the groups include the 'application 116-2' group, the 'application 116-0' group, and the 'application 116-2, application 116-0 group'.

The routine then enters a for-all loop that cycles through the applications 116 included in an application group (ln. 8). For example, for application group 'application 116-2, application 116-0' the for-all loop beginning at line 8 is executed twice. During execution, the memory used by a particular application 116 is increased by reference to the memory used by the application group (ln. 9). Importantly, the memory used by the application group is adjusted to reflect the number of applications 116 included in the application group. Using application group 'application 116-2, application 116-0' for illustration—the group consists of two applications 116 and includes the size of node 3030 as its memory used. Accordingly, each application 116 in the group is increased by an amount equal to one half of the memory used by node 3030.

After repeating line 9 for each application 116 in each group, variable worst_score is initialized to a predefined score (ln. 12). The score preferably reflects a score beyond which an application 116 is consuming a disproportionate amount of resources (e.g., memory 108).

Next, program flow enters a for-all loop that cycles through all of the applications 116 running under a given virtual machine (lns. 13-20).

For each application 116, a memory_policy function is executed in order to set the variable memory_limit for the application 116 (ln. 14). The memory_policy function preferably weighs the memory needs of the particular application 116 and other considerations to set the variable memory_limit.

A score function is then executed with the variable memory_limit and the amount of memory used by a given application 116 as arguments. The score function, as its name suggests, scores the resource usage of the application 116. The result of this function is then compared against the variable worst_score (ln. 16). If the score of the application 116 exceeds the variable worst_score, the variable worst_score is set to the score of the application 116 and the variable worst_offender is set to the application 116 (lns. 17-18).

After completing the for loop beginning on line 13, the variable worst_offender is compared to the variable previous_worst_offender (ln. 22). If the two match, a predefined application termination action is taken. As noted above, the particular steps taken are not an aspect of the present invention.

If the two do not match, a predefined remedial action is taken (ln. 24). Again, the particular steps taken are not an aspect of the present invention. The if statement beginning on line 21 reflects a policy by which applications 116 that continue to violate a resource usage policy must be dealt with more harshly than a first time or intermittent worst offender. However, this is not required in the present invention.

Finally, the variable previous_worst_offender is set to the variable worst_offender (ln. 26). This permits the comparison at line 21 the next time the main procedure is executed.

CONCLUSION

While the present invention is described with reference to a few specific embodiments, the description is illustrative of the invention and is not to be construed as limiting the invention. Various modifications may occur to those skilled in the art without departing from the true spirit and scope of the invention as defined by the appended claims.

APPENDIX A

Analysis Code 119

```
pass1 (root) {
    root.state = FOUND;
    work_node = root;
    depth = 0;
    while (work_node != NULL) {
        v = work_node;
        switch (v.state) {
            case FOUND:
                v.state = SCANNED;
                v.depth = depth;
                depth++;
                for all (v->w) {
                    if (w.state ==NULL) {
                        w.state = FOUND;
                        if (work_node.state == FOUND) work_node.prev = w;
                        w.next = work_node;
                        work_node = w;
                    }
                    else if (w.state == FOUND) {
                        if (w.prev == NULL) work_node = w.next;
                        else w.prev.next = w.next;
                        if (w.next != NULL AND w.next.state == FOUND) {
                            w.next.prev = w.prev;
                        }
                        if (work_node.state == FOUND) work_node.prev = w;
                        w.next = work_node;
                        work_ node = w;
                    }
                }
                break;
            case SCANNED:
                work_node = v.next;
                depth--;
                root_depth = depth;
                t = v;
                for all (v->w) {
                    r = root (w);
                    if (r.state == SCANNED AND r.depth < root_depth) {
                        root_depth = r.depth;
                        t = r;
                    }
                }
                if (t == v) {
                    v.state = REP;
                    v.set = EMPTYSET;
                    v.next = topo_sort;
                    topo_sort = v;
                }
                else {
                    v.state = DONE;
                    v.parent = t;
                }
                break;
        }
    }
}
```

APPENDIX A-continued

Analysis Code 119

```
    return topo_sort;
}
pass2 (topo_sort) {
    while (topo_sort != NULL) {
        root = topo_sort;
        topo_sort = root.next;
        Set s = root.set;
        work_node = root;
        root.state = FLOWING;
        while (work_node != NULL) {
            v = work_node;
            work_node = v.next;
            s = s ∪ v;
            for all (v->w) {
                switch (w.state) {
                    case NULL, FLOWING:
                        break;
                    case DONE, REP:
                        r = root (w);
                        if (r.state == REP) r.set = r.set ∪ s;
                        else {
                            w.state = FLOWING;
                            w.next = work_node;
                            work_node = w;
                        }
                        break;
                }
            }
            v.state = NULL;
        }
    }
}
root (x) {
    y = x;
    while (x.state == DONE) x = x.parent;
    while (y != x) {
        tmp = y.parent;
        y.parent = x;
        y = tmp;
    }
    return x;
}
doit (root, applications apps) {
    for all (applications a running under a virtual machine) {
        for all (roots app_root of a) {
            topo_sort = pass1 (app_root);
        }
    }
    for all (applications a running under a virtual machine) {
        for all (objects o in the root of a) {
            o.set =a;
        }
    }
    pass2 (topo_sort);
}
```

APPENDIX B

Enforcement Code 120

```
Main Procedure {
    If (free_heap_memory > threshold) {
        return (0);
    }
    Else {
        doit (root, apps)
        For all (application groups S found in second pass) {
            For all (applications a in application group S) {
                a.memory_used += S.memory_used /
                    S.number_of_applications
            }
        }
        worst_score = initial_value;
        For all (applications a running under a virtual machine ) {
            memory_limit = memory_policy (a)
```

APPENDIX B-continued

Enforcement Code 120

```
            a.score = score (memory_limit, a.memory_used)
            If (a.score > worst_score) {
                worst_score = a.score;
                worst_offender = a;
            }
        }
        If (worst_offender == previous worst_offender) {
            Apply predefined application termination action;
        } Else
            Apply predefined remedial action to worst_offender;
        }
    }
}
```

What is claimed is:

1. A method for determining usage of a resource by a set of applications running under a single virtual machine, the method comprising:
   associating components with respective ones of the running applications that are responsible for the respective components;
   identifying respective ones of the components that are shared by more than one of the running applications;
   for each of the identified shared components, apportioning respective amounts of the resource required by the identified shared component to the ones of the running applications sharing the identified shared component; and
   for each of the running applications in the set, determining a respective total amount of the resource used by the running application based on a sum of respective amounts of the resource required by unshared ones of the components associated with the running application and the respective required amounts of the resource apportioned to the ones of the identified shared components that are associated with the running application.

2. The method of claim 1, wherein said associating steps includes repeating for each application:
   identifying a component as a root component of an application; and
   traversing each component included in a set of components accessible from the root component of the application to identify one or more sets of strongly-connected-components, wherein each component in a set of strongly-connected-components is accessible from each other component in the set of strongly-connected-components.

3. The method of claim 2, wherein the traversing step comprises a depth first traversal of each component from the set of components accessible from the root component of the application beginning with the root component.

4. The method of claim 2, wherein the set of strongly-connected-components includes a representative component and zero or more non-representative components.

5. The method of claim 4, wherein the representative component is identified by reference to the number of components separating each component included in the set of strongly-connected-components from a component identified as a root component of an application having access to the set of strongly-connected-components such that a first number of components separating the representative component and the component identified as the root component of the application is not greater than a second number of components separating the zero or more non-representative components from the component identified as the root component of the application.

6. The method of claim 5, further including setting a parent pointer associated with each of said zero or more non-representative components to point to the representative component.

7. The method of claim 2, wherein the traversing step further includes establishing a pointer from a first representative component to a second representative component, wherein the ordering of the representative components is consistent with a depth-first traversal of each component included in a set of components accessible from the root component of the application.

8. The method of claim 7, wherein the root component of the application is the first representative component.

9. The method of claim 2, further including repeating for each application: creating a set of representative components for a set of strongly-connected-components associated with a running application; traversing each component included in a set of components accessible from the root component of the running application by reference to pointers linking each component; and including in the set of representative components each component in the set of components accessible from the root component that is accessible from only the root component of the running application.

10. The method of claim 1, wherein an application is responsible for a component if the component is accessible from a root set of threads of the application.

11. The method of claim 1, wherein an application is responsible for a component if the component is accessible from a root set of global variables of the application.

12. The method of claim 1, wherein the set of applications run in a memory space associated with the single virtual machine.

13. The method of claim 12, wherein the resources are maintained in a memory heap associated with the single virtual machine.

14. The method of claim 1, wherein associating and repeating steps are part of a debugging process, whereby resource usage by one or more applications being debugged is determined.

15. The method of claim 1, further including determining an amount of memory available for additional memory resource usage; and executing the associating, apportioning and determining steps if the memory available for additional memory resource usage drops below a predetermined level.

16. The method of claim 1, further including determining if an application is violating a memory resource usage policy; and applying a predefined remedial action on the application if the application is violating the memory resource usage policy.

17. The method of claim 1, further including determining if an application is violating a memory resource usage policy; and maintaining a count of the number of times an application violates the memory resource usage policy; and applying a predefined termination action on the application when the count exceeds a predefined number.

18. The method of claim 1, further including determining if an application is violating a memory resource usage policy; maintaining a log of memory resource usage violations for each application; and applying a predefined termination action on an application if the application violates the memory resource usage policy a predefined number of consecutive times.

19. The method of claim 1, further comprising determining which application, if any, from the set of applications violates a memory resource usage policy most egregiously; and applying a predefined remedial action on the application that violates the memory resource usage policy most egregiously.

20. The method of claim 1, further comprising determining which application violates a memory resource usage policy most egregiously; and applying a predefined termination action on the application that violates the memory resource usage policy most egregiously.

21. A computer program product for determining usage of a resource by a set of applications running under a single virtual machine, the computer program product for use in conjunction with a computer system, the computer program product comprising a non-transitory computer readable storage medium and a computer program mechanism embedded therein, the computer program mechanism comprising one or more software modules having executable instructions for:
associating components with respective ones of the running applications that are responsible for the respective component;
identifying respective ones of the components that are shared by more than one of the running applications;
for each of the identified shared components, apportioning respective amounts of the resource required by the identified shared component to the ones of the running applications sharing the identified shared component; and
for each of the running applications in the set, determining a respective total amount of the resource used by the running application based on a sum of respective amounts of the resource required by unshared ones of the components associated with the running application and the respective required amounts of the resource apportioned to the ones of the identified shared components that are associated with the running application.

22. The computer program product of claim 21, wherein the instructions for associating include instructions for: repeating for each application: identifying a component as a root component of an application; and traversing each component included in a set of components accessible from the root component of the application to identify one or more sets of strongly-connected-components, wherein each component in a set of strongly-connected-components is accessible from each other component in the set of strongly-connected-components.

23. The computer program product of claim 22, wherein the instructions for traversing include instructions for a depth first traversal of each component from the set of components accessible from the root component of the application beginning with the root component.

* * * * *